United States Patent
Beard et al.

(10) Patent No.: US 12,500,854 B2
(45) Date of Patent: Dec. 16, 2025

(54) SERVER-BASED-NOS DISAGGREGATED SWITCH DEVICE SYSTEM

(71) Applicant: Dell Products L.P., Round Rock, TX (US)

(72) Inventors: Neal Beard, Austin, TX (US); Padmanabhan Narayanan, Chennai (IN); Per Henrik Fremrot, Novato, CA (US); Colin Montgomery, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 18/484,567

(22) Filed: Oct. 11, 2023

(65) Prior Publication Data

US 2025/0126077 A1    Apr. 17, 2025

(51) Int. Cl.
*G06F 13/20* (2006.01)
*H04L 49/111* (2022.01)
*H04L 49/35* (2022.01)

(52) U.S. Cl.
CPC ............ *H04L 49/111* (2022.05); *H04L 49/35* (2013.01)

(58) Field of Classification Search
CPC .............................. H04L 49/111; H04L 49/35
See application file for complete search history.

(56) References Cited

U.S. PATENT DOCUMENTS

| | | | | |
|---|---|---|---|---|
| 2004/0215617 A1* | 10/2004 | Ramsey | .................. | G06F 3/023 |
| 2010/0103837 A1* | 4/2010 | Jungck | ................ | H04L 63/0227 |
| | | | | 370/252 |
| 2015/0236900 A1* | 8/2015 | Chung | .................. | H04L 45/586 |
| | | | | 709/221 |
| 2015/0293868 A1* | 10/2015 | Hishida | ............... | G06F 11/2092 |
| | | | | 710/38 |

* cited by examiner

*Primary Examiner* — Henry Tsai
*Assistant Examiner* — Kim T Huynh
(74) *Attorney, Agent, or Firm* — Joseph Mencher

(57) ABSTRACT

A server-based-Network Operating System (NOS) disaggregated switch device system includes a server device having a server chassis, a switch connector that is accessible on the server chassis, and a Central Processing Unit (CPU) system that is housed in the server chassis, that is coupled to the switch connector, and that is configured to provide a Network Operating System (NOS). Server/switch cabling is connected to the switch connector. A switch device includes a switch chassis, a server connector that is accessible on the switch chassis and that is connected to the server/switch cabling, and a Network Processing Unit (NPU) system that is housed in the switch chassis, that is coupled to the server connector, and that includes a memory subsystem that is configured to be provided with a plurality of switch tables via the server/switch cabling and by the NOS provided by the CPU system in the server device.

20 Claims, 25 Drawing Sheets

SERVER-BASED-NOS DISAGGREGATED SWITCH DEVICE SYSTEM

BACKGROUND

The present disclosure relates generally to information handling systems, and more particularly to a switch information handling system that has its Network Operating System (NOS) provided by a connected server information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as switch devices conventionally include a Network Processing Unit (NPU) Application Specific Integrated Circuit (ASIC) that provides a data plane for the switch device, as well as a "host" Central Processing Unit (CPU) (and corresponding host memory system and host storage system) that provides a Network Operating System (NOS) for the switch device, with the NOS providing a control and management plane for the switch device. However, the inventors of the present disclosure have recognized several issues with the provisioning of NOSs in switch devices in such a manner. For example, it is difficult to predict the compute and/or memory capabilities that will be required from a host CPU and its corresponding host memory system to provide the NOS and/or other features utilized with the switch device over a variety of deployments/use-cases during the lifetime of a switch device, and the failure of a memory device in the host memory system of a switch device can cause particular issues due to host memory system capacities typically being fixed in switch devices during their design and manufacture.

Furthermore, the link bandwidth between the NPU ASIC and the host CPU is typically underutilized, and in cases in which relatively high levels of packet transmission from the NPU ASIC to the host CPU is required (e.g., for telemetry operations, Internet Protocol Security (IPSec)/Firewall operations, etc.), the host CPU often becomes the "bottleneck" as a result of a lack of sufficient compute resources (e.g., due to Control Plane Policing (CoPP) rules). Further still, users of switch devices often wish to orchestrate microservices of the NOS (e.g., using a KUBERNETES® ecosystem) that will vary the compute, memory, and storage requirements of the host CPU and its host memory system and host storage system. Yet further still, the number of cores available in host CPUs in switch devices are relatively low and will not support application acceleration features such as inline cryptography operations, secure enclave provisioning, etc.

Accordingly, it would be desirable to provide a switch device system that addresses the issues discussed above.

SUMMARY

According to one embodiment, an Information Handling System (IHS) includes a chassis; a server connector that is accessible on the chassis; a Network Processing Unit (NPU) system that is housed in the chassis and that is coupled to the server connector; and a memory subsystem that is included in the NPU system and that is configured to be provided with a plurality of switch tables by a Network Operating System (NOS) provided by a Central Processing Unit (CPU) system in a server device via server/switch cabling when the server/switch cabling is connected to the server connector and the server device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
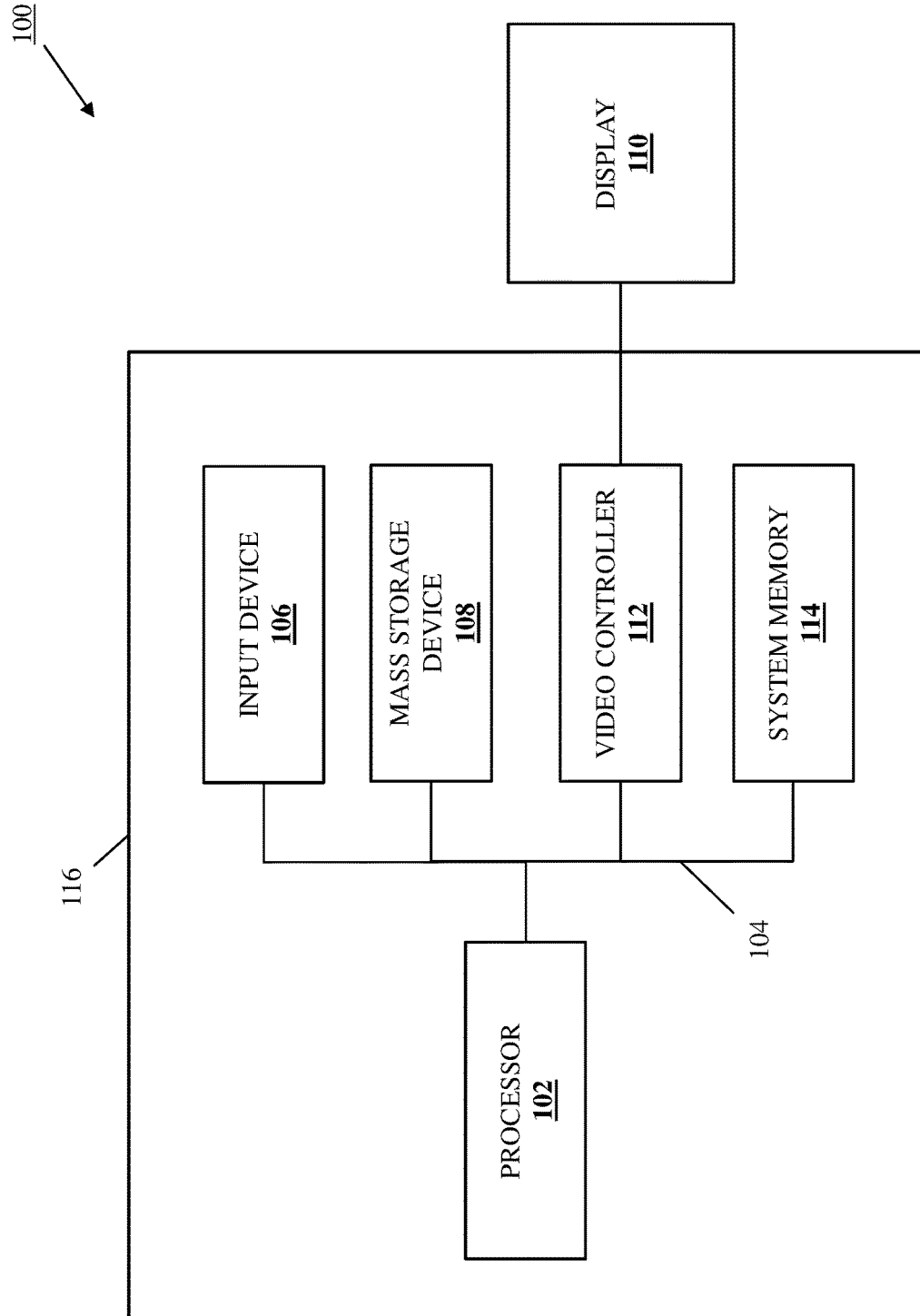
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
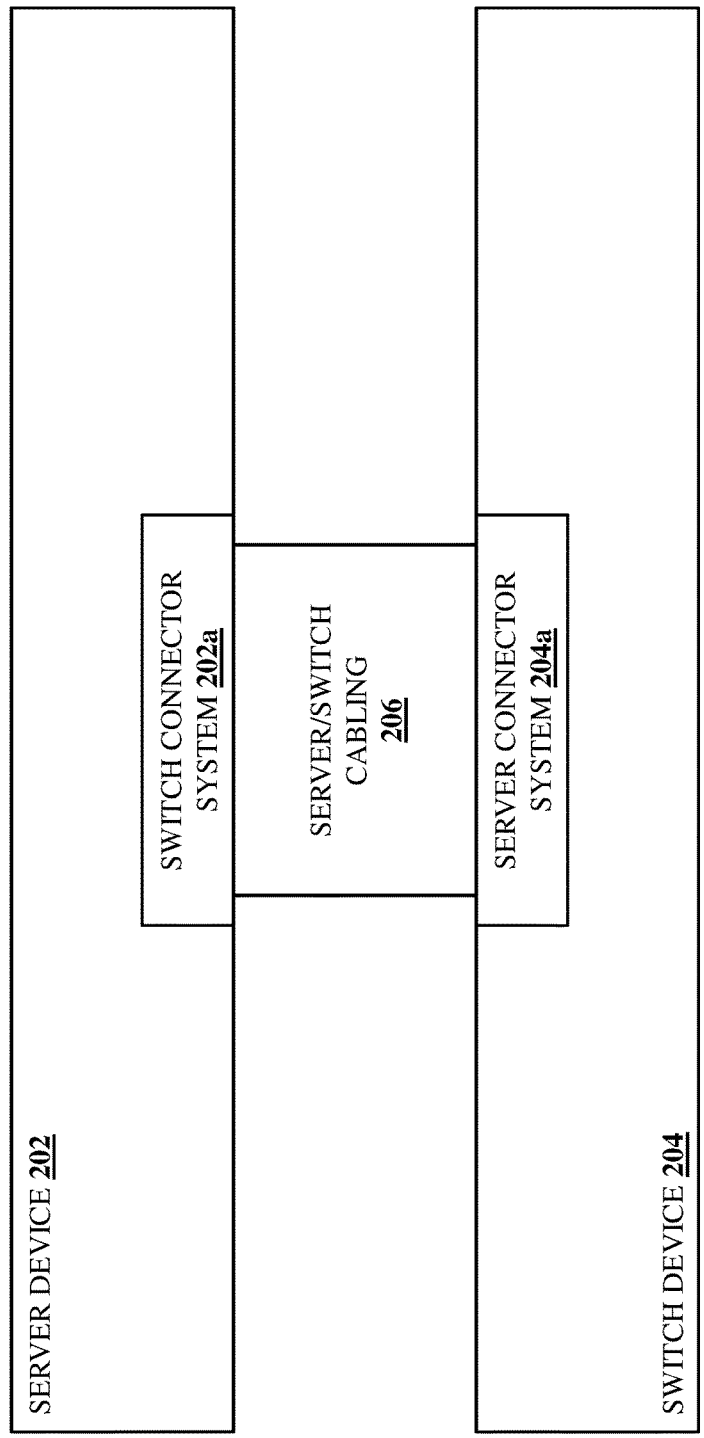
FIG. 2 is a schematic view illustrating an embodiment of a server-based-NOS disaggregated switch device system provided according to the teachings of the present disclosure.

Referring now to FIG. 2, an embodiment of a server-based-NOS disaggregated switch device system 200 that may be provided according to the teachings of the present disclosure is illustrated. In the illustrated embodiment, the server-based-NOS disaggregated switch device system 200 includes a server device 202. In an embodiment, the server device 202 may be provided by the IHS 100 discussed above with reference to FIG. 1, and/or may include some or all of the components of the IHS 100. However, while illustrated and discussed as being provided by a server device, one of skill in the art in possession of the present disclosure will recognize that the server-based-NOS disaggregated switch device system 200 may include other types of computing devices that may be configured to operate similarly as the server device 202 discussed below.

As can be seen in FIG. 2, the server device 202 includes a switch connector system 202a that, as discussed below, may include a Peripheral Component Interconnect express (PCIe) connector, a Universal Serial Bus (USB) connector, an optical connector, and/or other connectors that one of skill in the art in possession of the present disclosure would recognize as providing the switch connection functionality described below. In a specific example, the switch connector system 202a may include a riser card that may be connected to a motherboard in the server device 202, and that may provide an eight lane (i.e., "×8") connector that is accessible on a rear surface of a server chassis of the server device 202, as well as other any other switch connector components that would be apparent to one of skill in the art in possession of the present disclosure.

In the illustrated embodiment, the server-based-NOS disaggregated switch device system 200 also includes a switch device 204. In an embodiment, the switch device 204 may be provided by the IHS 100 discussed above with reference to FIG. 1, and/or may include some or all of the components of the IHS 100. However, while illustrated and discussed as being provided by a switch device, one of skill in the art in possession of the present disclosure will recognize that the server-based-NOS disaggregated switch device system 200 may include other types of networking devices that may be configured to operate similarly as the switch device 204 discussed below.

As can be seen in FIG. 2, the server device 202 includes a server connector system 204a that, as discussed below, may include a PCIe connector, a USB connector, an optical connector, and/or other connectors that one of skill in the art in possession of the present disclosure would recognize as providing the server connection functionality described below. In a specific example, the server connector system 204a may include an eight lane (i.e., "×8") connector that is accessible on a rear surface of a switch chassis of the switch device 204, as well as other any other server connector components that would be apparent to one of skill in the art in possession of the present disclosure.

In the illustrated embodiment, server/switch cabling 206 is connected to the switch connector system 202a on the server device 202, and to the server connector system 204a on the switch device 204, and one of skill in the art in possession of the present disclosure will appreciate how the server/switch cabling 206 may be provide by PCIe cabling, USB cabling, optical cabling (e.g., an OCuLink cable), and/or other cabling that would be apparent to one of skill in the art in possession of the present disclosure. In a specific example, the server/switch cabling 206 may include a respective eight lane (i.e., "×8") connector (e.g., a PCIe connector, a USB connector, an optical connector, etc.) on each of its ends, as well as other any other cabling components that would be apparent to one of skill in the art in possession of the present disclosure.

In a specific example, the length of the server/switch cabling 206 may be relatively short (e.g., less than 0.5 meters), and thus the server device 202 and the switch device 204 may be provided in a rack adjacent each other (e.g., in immediately adjacent device housings defined by the rack such that the server device 202 and the switch device 204 are provided in a "top/bottom" configuration immediately adjacent each other in the rack) in order to allow the server/switch cabling 206 to extend between the switch connector system 202a on the server device 202 and the server connector system 204a on the switch device 204. As discussed in further detail below, the server-based-NOS disaggregated switch device system 200 may be implemented in situations (e.g., in a datacenter) in which server devices like the server device 202 (or other server resources) are relatively abundant and available to provide the Network Operating System (NOS) or diagnostic system for the switch device 204 as discussed in further detail below. However, while a specific server-based-NOS disaggregated switch device system 200 has been illustrated and described, one of skill in the art in possession of the present disclosure will recognize that the server-based-NOS disaggregated switch device system of the present disclosure may include a variety of components and component configurations while remaining within the scope of the present disclosure as well.

Figure 3:
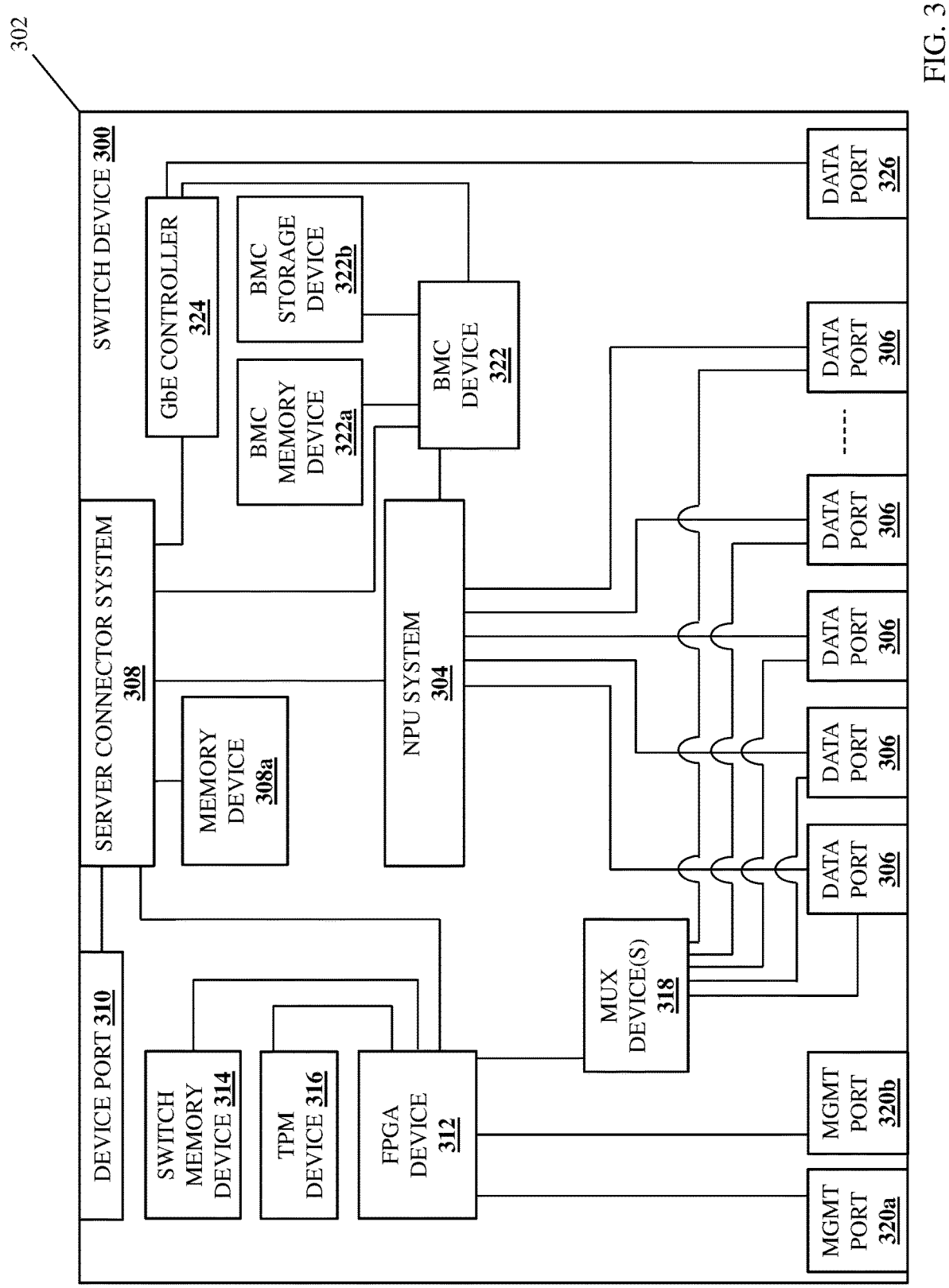
FIG. 3 is a schematic view illustrating an embodiment of a switch device that may be provided in the server-based-NOS disaggregated switch device system of FIG. 2.

Referring now to FIG. 3, an embodiment of a switch device 300 is illustrated that may provide the switch device 204 discussed above with reference to FIG. 2. As such, the switch device 300 may be provided by the IHS 100 discussed above with reference to FIG. 1 and/or may include some or all of the components of the IHS 100. Furthermore, while illustrated and discussed as being provided by a switch device, one of skill in the art in possession of the present disclosure will recognize that the functionality of the switch device 300 discussed below may be provided by other networking devices that are configured to operate similarly as the switch device 300 discussed below.

In the illustrated embodiment, the switch device 300 includes a chassis 302 that houses the components of the switch device 300, only some of which are illustrated and described below. As will be appreciated by one of skill in the art in possession of the present disclosure, the chassis 302 of the switch device 300 does not house a Central Processing Unit (CPU) system (commonly referred to as a "host" CPU "complex") that is used in conventional switch devices to provide a Network Operating System (NOS) or diagnostics system and, thus, need not house a storage device (e.g., a Solid State Drive (SSD) storage device), a "host" memory system (e.g., a Dynamic Random Access Memory (DRAM) system), a bootloader storage device (e.g., a Serial Peripheral Interface (SPI) flash storage device), as well as any other components that one of skill in the art in possession of the present disclosure would recognize as being used in conventional switch devices to initialize and run a NOS or diagnostics system.

The chassis 302 houses a Network Processing Unit (NPU) system that may be provided by a NPU Application Specific Integrated Circuit (ASIC) device and thus may include an NPU processor subsystem and an NPU memory subsystem that is coupled to the NPU processor subsystem and that includes instructions that, when executed by the NPU processor subsystem, cause the NPU processor subsystem to provide a networking engine that is configured to provide a data plane for the switch device 300 and perform the switch device data plane functionality (e.g., SERializer/DESerializer (SERDES) operations and/or other data plane operations that would be apparent to one of skill in the art in possession of the present disclosure) of the networking engines and/or switch devices discussed below. In a specific example, the NPU system 304 may be an NPU system available from BROADCOM® Inc. of San Jose, California, United States, although other NPU systems are envisioned as falling within the scope of the present disclosure as well.

In the illustrated embodiment, the chassis 302 includes a plurality of data ports 306 that are each coupled to the NPU system 304 (e.g., via a coupling between each port 306 and the NPU processor subsystem in the NPU system 304). As will be appreciated by one of skill in the art in possession of the present disclosure, the data ports 306 may be located on a "front" surface of the chassis 302 of the switch device 300 and may be configured to transmit and receive data plane communications that are processed by the NPU system 304. In a specific example, the data ports 306 may be "primary data" switch ports that are configured to connect to transceiver devices such as Small Form-factor Pluggable (SFP) transceiver devices (e.g., SFP28 transceiver devices), Quad SFP (QSFP) transceiver devices (e.g., QSFP transceiver devices, QSFP28 transceiver devices, QSFP Double Density (QSFP-DD) transceiver devices), and/or other transceiver devices that would be apparent to one of skill in the art in possession of the present disclosure. However, while specific data ports 306 are illustrated and described, one of skill in the art in possession of the present disclosure will appreciate how other ports will fall within the scope of the present disclosure as well.

The chassis 302 also includes a server connector system 308 that is coupled to the NPU system 304 and that may provide the server connector system 204a on the switch device 204 discussed above with reference to FIG. 2. As such, the server connector system 308 may be accessible on a rear surface of the chassis 302 of the switch device 300, and may include a PCIe connector, a USB connector, an optical connector, and/or other connectors that one of skill in the art in possession of the present disclosure would recognize as providing the server connection functionality described below. In the specific examples provided below, the server connector system 308 provides an eight lane (i.e., "×8") connector (e.g., a ×8 PCIe connector) that is accessible on a rear surface of the chassis 302 of the switch device 300, and that has four of its lanes (i.e., "×4") coupled to the NPU system 304, although other capacity (e.g., ×16 connectors) and/or technology connectors and connections will fall within the scope of the present disclosure as well.

As discussed in further detail below, some embodiments of the present disclosure may provide a switch subsystem in the server connector system 308 (e.g., a PCIe switch subsystem that is coupled to the PCIe connector included on server connector system 308, as well as other switch subsystems that would be apparent to one of skill in the art in possession of the present disclosure). As will be appreciated by one of skill in the art in possession of the present disclosure, the use of a switch subsystem in the server connector system 308 allows the NOS or diagnostic system provided by the server device 202 discussed above and described in further detail below to view that switch subsystem as a single device (e.g., a single PCIe device). Furthermore, one of skill in the art in possession of the present disclosure will appreciate how the use of the switch subsystem in the server connector system 308 allows a secondary server device that is similar to the "primary" server device 202 discussed above and described in further detail below to be connected to the server connector system 308 (e.g., via a Non-Transparent Bridge (NTB) in a PCIe switch subsystem) in order to, for example, provide redundancy (e.g., to provide a redundant NOS on the secondary server device that can take over operations of a primary NOS provided by the primary server device 202).

However, other embodiments of the present disclosure may provide a re-timer subsystem in the server connector system 308 (e.g., a PCIe re-timer subsystem that is coupled to the PCIe connector included on server connector system 308, as well as other re-timer subsystems that would be apparent to one of skill in the art in possession of the present disclosure), with the re-timer subsystem configured to compensate for the increased distance between the NPU system 304 and the CPU system that provides the NOS in the server device 202 discussed above and described in further detail below by regenerating signals transmitted between the CPU system and components of the switch device 300 to ensure their signal quality meets standards (e.g., PCIe standards). As will be appreciated by one of skill in the art in possession of the present disclosure, the use of a re-timer subsystem in the server connector system 308 provides a relatively lower cost solution relative to the switch subsystem discussed above, but will cause the NOS provided by the server device 202 discussed above and described in further detail below to "see" multiple devices (e.g., a respective PCIe device for each of a plurality of components in the switch device 204/300). Furthermore, the server connector system 308 may be provided with other components that one of skill in the art in possession of the present disclosure would recognize as enabling the communications described below between the switch device 300 and a NOS or diagnostics system provided by a server device.

In the illustrated embodiment, the chassis 302 houses a memory device 308a that is coupled to the server connector system 308. For example, the memory device 308a may be provided by an Electronically Erasable Programmable Read-Only Memory (EEPROM) device that may store information that is used to provide the functionality of the server connector system 308 described below. In a specific example, the memory device 308a may be a switch subsystem EEPROM device that stores switch subsystem configuration information (e.g., PCIe switch subsystem configuration information), connector bifurcation information (e.g., PCIe connector bifurcation information), switch subsystem firmware, and/or other switch subsystem information that one of skill in the art in possession of the present disclosure would recognize as being used to configure a switch subsystem in the server connector system 308.

In another specific example, the memory device 308a may be a re-timer subsystem EEPROM device that stores re-timer subsystem configuration information (e.g., PCIe re-timer subsystem configuration information), connector bifurcation information (e.g., PCIe connector bifurcation information), re-timer subsystem firmware, and/or other re-timer subsystem information that one of skill in the art in possession of the present disclosure would recognize as being used to configure a re-timer subsystem in the server connector system 308. However, while specific examples are provided, one of skill in the art in possession of the present disclosure will appreciate how the memory device 308a may store a variety of information for use in configuring the server connector system 308 while remaining within the scope of the present disclosure.

The chassis 302 may also include a device port 310 that is coupled to the server connector system 308. In an embodiment, the device port 310 may be provided by a Universal Serial Bus (USB) type A (USB-A) port that is illustrated as being located on a rear surface of the chassis 302 of the switch device 300 with the server connector system 308, but that may be located on a front surface of the chassis 302 of the switch device 300 while remaining within the scope of the present disclosure as well, and one of skill in the art in possession of the present disclosure will appreciate how the device port 310 may be used to connect a storage device or other components to the switch device 300. As will be appreciated by one of skill in the art in possession of the present disclosure, a USB-A port that provides the device port 310 may be connected to the server connector system 308 by a PCIe-to-USB converter. In a specific example, the management port 310 may be coupled to a single lane (i.e., "×1") of the eight lane (i.e., "×8") connector (e.g., a ×8 PCIe connector) that may be included in the server connector system 308 as discussed above, although different technology and/or capacity connectors and connections will fall within the scope of the present disclosure as well.

The chassis 302 may also house a Field Programmable Gate Array (FPGA) device 312 that is coupled to the server connector system 308. In a specific example, the FPGA device 312 may be coupled to a single lane (i.e., "×1") of the eight lane (i.e., "×8") connector (e.g., a ×8 PCIe connector) that may be included in the server connector system 308 as discussed above, although different technology and/or capacity connectors and connections will fall within the scope of the present disclosure as well. As will be appreciated by one of skill in the art in possession of the present disclosure, the FPGA device 312 may be provided in the chassis 302 of the switch device 300 and configured to couple switch device components in the switch device 300 to the server connector system 308 in order to enable communications between those switch device components and the NOS or diagnostics system provided by the server device 202 discussed above and described in further detail below.

In the illustrated embodiment, the chassis 302 houses a switch memory device 314 that is coupled to the FPGA device 312 via, for example, an Inter-Integrated Circuit (I2C) connection, although other connections will fall within the scope of the present disclosure as well. In a specific example, the switch memory device 314 may be provided by a switch device EEPROM device that stores switch device configuration information such as the Out-Of-Band Management (OOBM) Media Access Control (MAC) address discussed below, as well as any other switch device EEPROM information that would be apparent to one of skill in the art in possession of the present disclosure. In the illustrated embodiment, the chassis 302 also houses a Trusted Platform Module (TPM) device 316 that is coupled to the FPGA device 312 via, for example, an I2C connection, although other connections are envisioned as falling within the scope of the present disclosure as well. In a specific example, the TPM device 314 may include a secure cryptoprocessor device that includes a dedicated microcontroller that is configured to secure hardware in the switch device 300 via the use of integrated cryptographic keys, as well as perform any other TPM functionality that would be apparent to one of skill in the art in possession of the present disclosure.

In the illustrated embodiment, the chassis 302 also houses one or more multiplexer (MUX) device(s) 318 that are coupled to the FPGA device 312 via, for example, I2C connection(s), although other connections are envisioned as falling within the scope of the present disclosure as well. Furthermore, the MUX device(s) 318 are also coupled to each of the data ports 306 described above via, for example, I2C connection(s), although other connections are envisioned as falling within the scope of the present disclosure as well. In the illustrated embodiment, the chassis 302 also includes a plurality of management ports 320a and 320b that are coupled to the FPGA device 312. For example, the management port 320a may be provided an industry standard 45 Registered Jack (RJ45) console port that is connected to the FPGA device 312 via an RS-232 connection, while the management port 320b may be provided by a micro-USB type B console port that is connected to the FPGA device 312 by a Universal Asynchronous Receiver-Transmitter (UART)-to-USB connection (e.g., including a UART-to-USB converter device), although other management ports and/or connections will fall within the scope of the present disclosure as well. As will be appreciated by one of skill in the art in possession of the present disclosure, the management ports 320a and 320b may allow for direct management of the switch device 300 by allowing a management device (e.g., a laptop/notebook computing device) to be connected directly to the switch device 300 (e.g., via a console cable connected to the management device and the management port 320a or 320b on the switch device 300) in order to perform any of a variety of management operations on the switch device 300.

The chassis 302 may also house a Baseboard Management Controller (BMC) device 322 that is coupled to the server connector system 308, and that may be provided by an integrated DELL® Remote Access Controller (iDRAC) device that is provided in switch devices available from DELL® Inc. of Round Rock, Texas, United States, as well as any other BMC devices that would be apparent to one of skill in the art in possession of the present disclosure. In a specific example, the BMC device 322 may be coupled to a single lane (i.e., "×1") of the eight lane (i.e., "×8") connector (e.g., a ×8 PCIe connector) that may be included in the server connector system 308 as discussed above, although different technology and/or capacity connectors and connections will fall within the scope of the present disclosure as well.

As will be appreciated by one of skill in the art in possession of the present disclosure, the BMC device 312 may be configured to provide remote management capabilities for the switch device 300, as well as any other BMC operations that would be apparent to one of skill in the art in possession of the present disclosure. In the illustrated embodiment, the BMC device 322 is also coupled to the NPU system 304 (e.g., via a coupling between the BMC device 322 and the NPU processor subsystem discussed above). For example, while not described in detail below, one of skill in the art in possession of the present disclosure will appreciate how the BMC device 322 may be coupled to the NPU system 304 by a Remote CPU (RCPU) connection that may allow the BMC device 322 to configure the NPU system 304 to allow initialization (e.g., "boot") of the switch device 300 in the event an NOS or diagnostics system cannot be provided for the switch device 300 by the server device 202 discussed above and described in further detail below.

In the illustrated embodiment, the chassis 302 houses a BMC memory device 322a that is coupled to the BMC device 322 and that may be provided by one or more Dynamic Random Access Memory (DRAM) devices, as well as a BMC storage device 322b that is coupled to the BMC device 322 and that may be provided by one or more flash storage devices, and one of skill in the art in possession of the present disclosure will appreciate how the BMC device 322 may be configured to utilize the BMC memory device 322a and the BMC storage device 322b for any of a variety of BMC operations known in the art.

The chassis 302 may also house a Gigabit Ethernet (GbE) controller 324 that is coupled to the server connector system 308, and that may be configured to control the Out-Of-Band (OOB) transmission of data for any of a variety of management operations that would be apparent to one of skill in the art in possession of the present disclosure. In a specific example, the GbE controller 324 may be coupled to a single lane (i.e., "×1") of the eight lane (i.e., "×8") connector (e.g., a ×8 PCIe connector) that may be included in the server connector system 308 as discussed above, although different technology and/or capacity connectors and connections will fall within the scope of the present disclosure as well. In the illustrated embodiment, the GbE controller 324 is connected to the BMC device 322. For example, the GbE controller 324 may be connected to the BMC device 322 by a Network Controller SideBand (NC-SI) connection, although other connections are envisioned as falling within the scope of the present disclosure as well.

In the illustrated embodiment, the chassis 302 also includes a data port 326 that is coupled to the GbE controller 324. In a specific example, the data port 326 may be a "management data" switch port that is provided by an RJ-45 Ethernet connector and that is configured to connect to a management network (e.g., via a Ethernet cable connected to the data port 326 and the management network) and transmit data received by the GbE controller 324 from the BMC device 322 and/or a NOS or diagnostics system provided by the server device 202 discussed above and described in further detail below. However, while a specific data port 326 is illustrated and described, one of skill in the art in possession of the present disclosure will appreciate how other ports will fall within the scope of the present disclosure as well. Furthermore, while a specific switch device 300 has been illustrated and described, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the server-based-NOS disaggregated switch device functionality discussed below, while remaining within the scope of the present disclosure as well.

Figure 4:
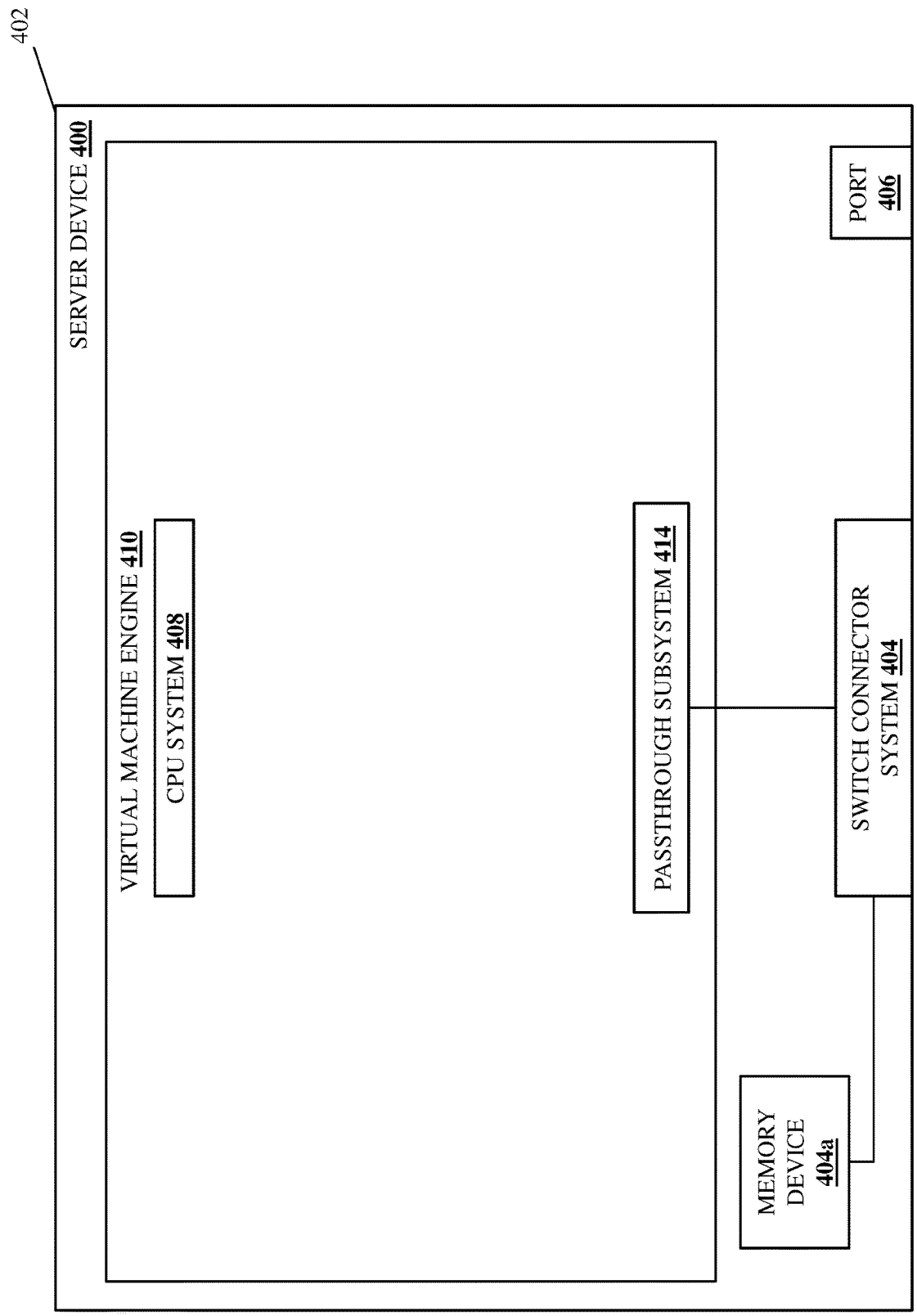
FIG. 4 is a schematic view illustrating an embodiment of a server device that may be provided in the server-based-NOS disaggregated switch device system of FIG. 2.

Referring now to FIG. 4, an embodiment of a server device 400 is illustrated that may provide the server device 202 discussed above with reference to FIG. 2. As such, the server device 400 may be provided by the IHS 100 discussed above with reference to FIG. 1 and/or may include some or all of the components of the IHS 100. Furthermore, while illustrated and discussed as being provided by a server device, one of skill in the art in possession of the present disclosure will recognize that the functionality of the server device 400 discussed below may be provided by other devices that are configured to operate similarly as the server device 400 discussed below. In the illustrated embodiment, the server device 400 includes a chassis 402 that houses the components of the server device 400, only some of which are illustrated and described below.

For example, the chassis 302 may include a switch connector system 404 that may provide the switch connector system 202a on the server device 202 discussed above with reference to FIG. 2. As such, the switch connector system 404 may be accessible on a rear surface of the chassis 402 of the server device 400, and may include a PCIe connector, a USB connector, an optical connector, and/or other connectors that one of skill in the art in possession of the present disclosure would recognize as providing the server connection functionality described below. In the specific examples provided below, the switch connector system 404 provides an eight lane (i.e., "×8") connector (e.g., a ×8 PCIe connector) that is accessible on a rear surface of the chassis 402 of the server device 400, although other capacity (e.g., a ×16 connector) and/or technology connectors and connections will fall within the scope of the present disclosure as well. As discussed in further detail below, some embodiments of the present disclosure may provide a switch subsystem in the switch connector system 404 (e.g., a PCIe switch subsystem that is coupled to the PCIe connector included on switch connector system 404, as well as other switch subsystems that would be apparent to one of skill in the art in possession of the present disclosure).

However, other embodiments of the present disclosure may provide a re-timer subsystem in the switch connector system 404 (e.g., a PCIe re-timer subsystem that is coupled to the PCIe connector included on switch connector system 404, as well as other re-timer subsystems that would be apparent to one of skill in the art in possession of the present disclosure), with the re-timer subsystem configured to compensate for the increased distance between the NPU system 304 in the switch device 204/300 and the CPU system that provides the NOS in the server device 400 (described in further detail below) by regenerating signals transmitted between the CPU system and components of the switch device 204/300 to ensure their signal quality meets standards (e.g., PCIe standards). As will be appreciated by one of skill in the art in possession of the present disclosure, the use of a re-timer subsystem in the switch connector system 404 provides a relatively lower cost solution relative to the switch subsystem discussed above. Furthermore, the switch connector system 404 may be provided with other components that one of skill in the art in possession of the present disclosure would recognize as enabling the communications described below between the switch device 204/300 and a NOS or diagnostics system provided by the server device 400.

In the illustrated embodiment, the chassis 402 houses a memory device 404a that is coupled to the switch connector system 404. For example, the memory device 404a may be provided by an EEPROM device that may store information needed to provide the functionality of the switch connector system 404 described below. In a specific example, the memory device 404a may be a switch subsystem EEPROM device that stores switch subsystem configuration information (e.g., PCIe switch subsystem configuration information), connector bifurcation information (e.g., PCIe connector bifurcation information), switch subsystem firmware, and/or other switch subsystem information that one of skill in the art in possession of the present disclosure would recognize as being used to configure a switch subsystem in the switch connector system 404.

In another specific example, the memory device 404a may be a re-timer subsystem EEPROM device that stores re-timer subsystem configuration information (e.g., PCIe re-timer subsystem configuration information), connector bifurcation information (e.g., PCIe connector bifurcation information), re-timer subsystem firmware, and/or other re-timer subsystem information that one of skill in the art in possession of the present disclosure would recognize as being used to configure a re-timer subsystem in the switch connector system 404. However, while specific examples are provided, one of skill in the art in possession of the present disclosure will appreciate how the memory device 404a may store a variety of information for use in configuring the switch connector system 404 while remaining within the scope of the present disclosure.

In the illustrated embodiment, the chassis 402 also includes a data port 406. In a specific example, the data port 406 may be "management data" server port that may be provided on a Local Area Network (LAN) On Motherboard (LOM) subsystem in the server device 400, an Open Compute Project (OCP) networking adapter subsystem in the server device 400, and/or other management data server port subsystems, and that is configured to connect to a management network (e.g., via a Ethernet cable connected to the data port 406 and the management network) and transmit data (e.g., to the switch device 204/300 via the data port 326 discussed above with reference to FIG. 3). However, while a specific data port 406 is illustrated and described, one of skill in the art in possession of the present disclosure will appreciate how other ports will fall within the scope of the present disclosure as well.

In the illustrated embodiment, the chassis 402 houses a Central Processing Unit (CPU) system 408 that may include CPU processor subsystem, a CPU memory subsystem, a CPU storage subsystem, and/or other CPU system components that one of skill in the art in possession of the present disclosure would recognize as providing the functionality of the CPU system 408 described below. In an embodiment, the CPU memory subsystem includes instructions that, when executed by the CPU processor subsystem, cause the CPU processor subsystem to provide a virtual machine engine 410 that, as discussed below, may be configured to provide virtual machines using the hardware components (e.g., the CPU processor subsystem, CPU memory subsystem, and CPU storage subsystem discussed above, as well as accelerator devices, Graphics Processing Unit (GPU) devices, etc.) included in the chassis 402 of the server device 400. However, while a specific server device 400 has been illustrated and described, one of skill in the art in possession of the present disclosure will recognize that server devices (or other devices operating according to the teachings of the present disclosure in a manner similar to that described below for the server device 400) may include a variety of components and/or component configurations for providing conventional server device functionality, as well as the server-based-NOS disaggregated switch device functionality discussed below, while remaining within the scope of the present disclosure as well.

Figure 5:
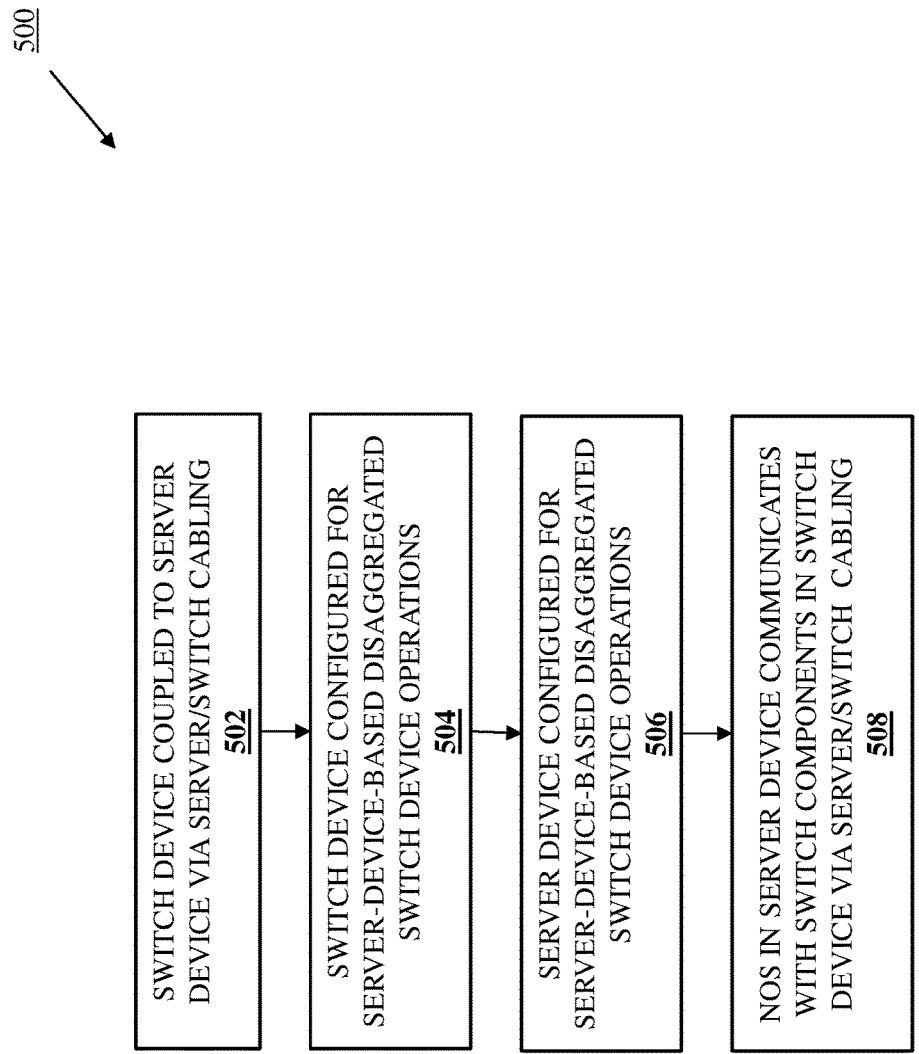
FIG. 5 is a flow chart illustrating an embodiment of a method for providing a server-based-NOS disaggregated switch device.

Referring now to FIG. 5, an embodiment of a method 500 for providing a server-based-NOS disaggregated switch device is illustrated. As will be appreciated by one of skill in the art in possession of the present disclosure, conventional disaggregation of switch devices and their NOSs allows users to purchase switch devices from switch device manufacturers or vendors, while purchasing the NOS for those switch devices from NOS manufacturers or vendors that are different from the switch device manufacturers or vendors. However, as discussed below, the systems and methods of the present disclosure disaggregate a Network Operating System (NOS) from the switch device that uses it by providing that NOS for that switch device using a server device that is coupled to that switch device via server/switch cabling.

For example, the server-based-Network Operating System (NOS) disaggregated switch device system of the present disclosure may include a server device having a server chassis, a switch connector that is accessible on the server chassis, and a Central Processing Unit (CPU) system that is housed in the server chassis, that is coupled to the switch connector, and that is configured to provide a Network Operating System (NOS). Server/switch cabling is connected to the switch connector. A switch device includes a switch chassis, a server connector that is accessible on the switch chassis and that is connected to the server/switch cabling, and a Network Processing Unit (NPU) system that is housed in the switch chassis, that is coupled to the server connector, and that includes a memory subsystem that is configured to be provided with a plurality of switch tables via the server/switch cabling and by the NOS provided by the CPU system in the server device. As will be appreciated by one of skill in the art in possession of the present disclosure, the systems and methods of the present disclosure remedy the issues associated with the conventional provisioning of a NOS for a switch device using a CPU in that switch device, and provide benefits associated with provisioning NOSs using server devices that typically have CPU systems with relatively more advanced processors and memory devices relative to those found in conventional switch devices (e.g., 96-core CPUs in conventional server devices vs. 4-core CPUs in conventional switch devices).

The method 500 begins at block 502 where a switch device is coupled to a server device via server/switch cabling. In an embodiment, at block 502, a network administrator or other user may couple the switch device 204 to the server device 202 using the server/switch cabling 206 similarly as illustrated and described above with reference to FIG. 2. As such, in a specific example, the server device 202 and the switch device 204 may be provided in a rack adjacent each other (e.g., in immediately adjacent device housings defined by the rack such that the server device 202 and the switch device 204 are provided in a "top/bottom" configuration immediately adjacent each other in the rack), and the server/switch cabling 206 may be connected to the switch connector system 202a on the server device 202, and to the server connector system 204a on the switch device 204.

The method 500 then proceeds to block 504 where the switch device is configured for server-device-based disaggregated switch device operations. In an embodiment, at block 504, the switch device 204/300 may be powered on, reset, rebooted, and/or otherwise initialized and, in response, the server connector system 308 in the switch device 204/300 (e.g., a PCIe switch subsystem or PCIe re-timer subsystem in the server connector system 308) may read the memory device 308a and use the information stored therein in order to configure the server connector system 308. For example, the configuration of the server connector system 308 at block 504 may include bifurcating the lanes included in the connector in the server connector system 308 based on a switch device configuration stored in the memory device 308a. Continuing with the specific examples provided above, the bifurcation of the lanes included in the connector in the server connector system 308 may include bifurcating four lanes (i.e., "×4") to the NPU system 304, one lane (i.e., "×1") to the device port 310, one lane (i.e., "×1") to the FPGA device 312, one lane (i.e., "×1") to the BMC device 322, and one lane (i.e., "×1") to the GbE controller 324. However, while specific configuration operations are described as being performed in response to the initialization of the switch device 300, one of skill in the art in possession of the present disclosure will appreciate how a variety of configuration operations may be performed by the switch device 300 in order to enable the functionality described below while remaining within the scope of the present disclosure as well.

The method 500 then proceeds to block 506 where the server device is configured for server-device-based disaggregated switch device operations. In a specific example, during or prior to the method 500, the server device 202/400 may be provided to a network administrator or other user as a "Bare Metal Server (BMS)" that may have been connected to the switch device 204/400 at block 502. In an embodiment, at block 506 and in response to being initialized (e.g., along with the switch device 204/300 at block 504), the switch connector system 404 in the server device 202/400 (e.g., a PCIe switch subsystem or PCIe re-timer subsystem in the switch connector system 404) may read the memory device 404a and use the information stored therein in order to configure the switch connector system 404.

For example, the configuration of the switch connector system 404 at block 506 may include bifurcating the lanes included in the connector in the switch connector system 404 based on a switch device configuration stored in the memory device 404a. Continuing with the specific examples provided above, the bifurcation of the lanes included in the connector in the switch connector system 404 may include bifurcating four lanes (i.e., "×4") for use in communicating with the NPU system 304 in the switch device 204/300, one lane (i.e., "×1") for use in communicating with the device port 310 in the switch device 204/300, one lane (i.e., "×1") for use in communicating with the FPGA device 312 in the switch device 204/300, one lane (i.e., "×1") for use in communicating with the BMC device 322 in the switch device 204/300, and one lane (i.e., "×1") for use in communicating with the GbE controller 324 in the switch device 204/300. However, while specific bifurcation operations are described as being performed on the connector in the switch connector system 404, one of skill in the art in possession of the present disclosure will appreciate how a variety of bifurcation operations may be performed by the server device 400 (e.g., on a sixteen lane connector (e.g., "×16" connector) in order to enable the functionality described below while remaining within the scope of the present disclosure as well.

Figure 6:
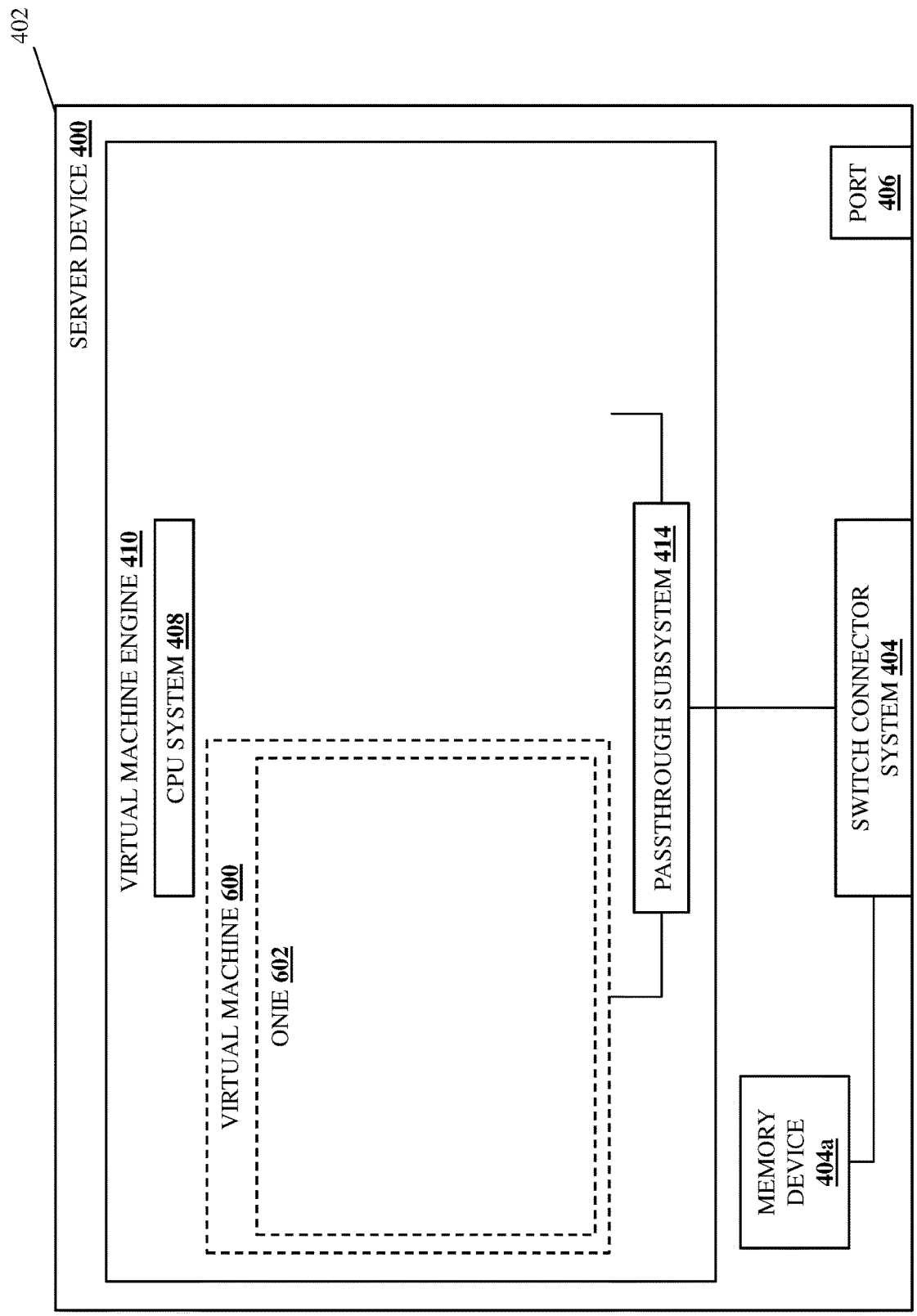
FIG. 6 is a schematic view illustrating an embodiment of the server device of FIG. 4 operating during the method of FIG. 5.

With reference to FIG. 6, at block 506, the network administrator or other user may configure the virtual machine engine 410 in the server device 400 to utilize first portions of the processing resources (e.g., virtual CPU (vCPU) resources), memory resources (e.g., virtual Random Access Memory (vRAM) resources), storage resource (e.g., virtual disk (vDisk) resources), and/or any other resources in the server device 400 to provide a virtual machine 600 that is coupled to the passthrough subsystem 414. The network administrator or other user may then configured to virtual machine 600 to provide an Open Network Install Environment (ONIE) 602.

Figure 7:
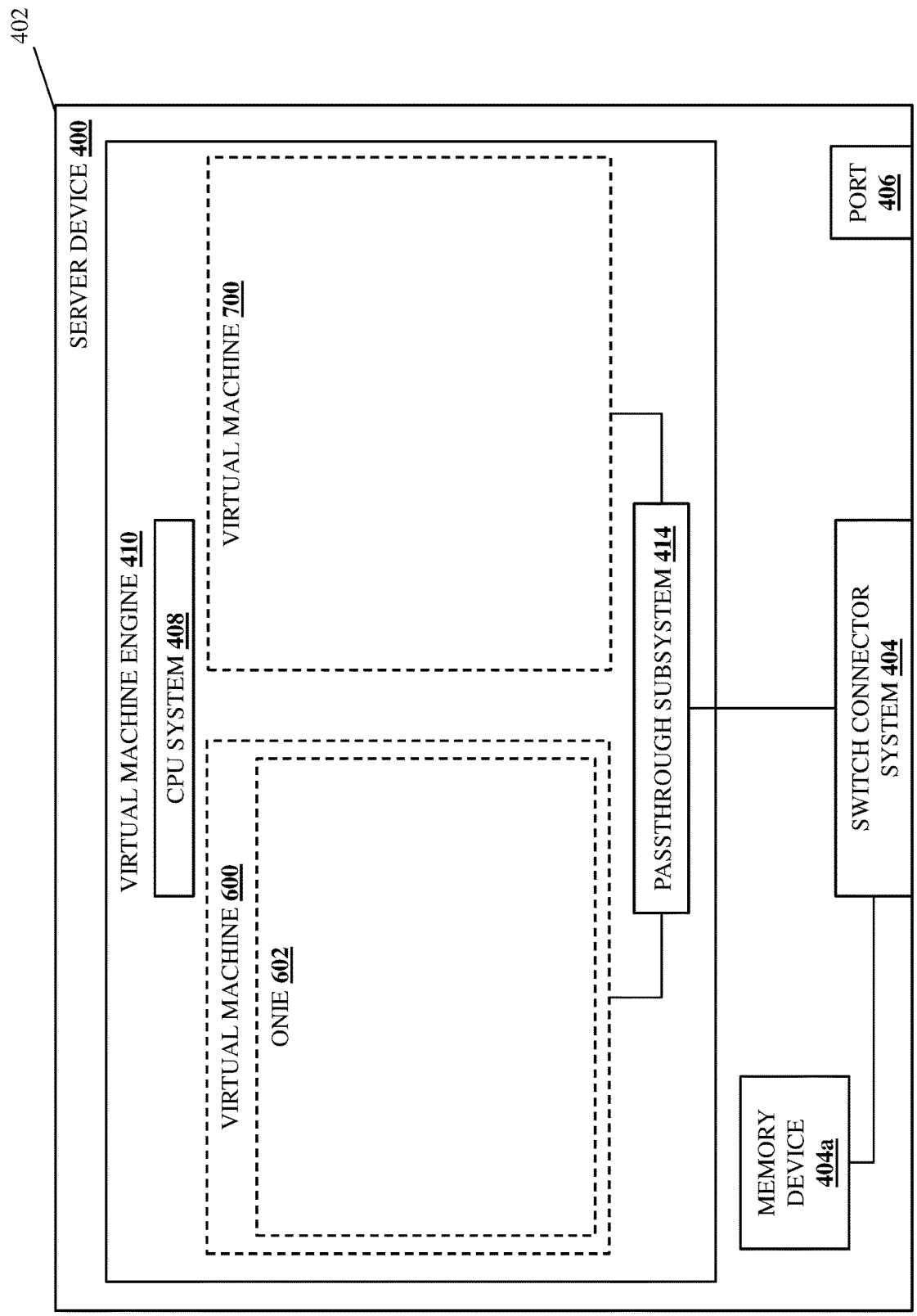
FIG. 7 is a schematic view illustrating an embodiment of the server device of FIG. 4 operating during the method of FIG. 5.

With reference to FIG. 7, at block 506, the network administrator or other user may also configure the virtual machine engine 410 in the server device 400 to utilize second portions of the processing resources (e.g., virtual CPU (vCPU) resources), memory resources (e.g., virtual Random Access Memory (vRAM) resources), storage resource (e.g., virtual disk (vDisk) resources), and/or any other resources in the server device 400 to provide a virtual machine 700 that is coupled to the passthrough subsystem 414, and that may later be provided with an NOS (or diagnostic system) using the ONIE 602 on the virtual machine 602 as discussed in further detail below.

In a specific example, during or prior to the method 500, the server device 202/400 may be provided with virtualization extensions and an Input/Output Memory Management Unit (IOMMU) extension enabled in a Basic Input/Output System (BIOS) (not illustrated) in the server device 400 in order to allow the server device 400 to support virtualization operations by a Virtual Machine Manager (e.g., provided by the virtual machine engine 410) that allow passthrough communications (e.g., PCIe passthrough communications) for directed Input/Output (I/O) transmitted by the virtual machine 700 via the passthrough subsystem 414. As such, those passthrough communications may be initially configured at block 506 during the instantiation of the virtual machine 700 by assigning the riser card (e.g., a PCIe riser card discussed above) in the switch connector system 202a/404 of the server device 202/400 exclusively to the virtual machine 700 for use in Direct Memory Access (DMA) operations, interrupt mapping with that virtual machine, and/or other configuration operations that would be apparent to one of skill in the art in possession of the present disclosure. As such, the virtual machine 700 may be "pinned" to the server device 202/400 (e.g., with virtual machine migration subsystems such as VMOTION® disabled), with the riser card in the switch connector system 202a/404 of the server device 202/400 assigned to the virtual machine 700 in a "passthrough" mode (e.g., a PCIe passthrough mode).

Figure 8:
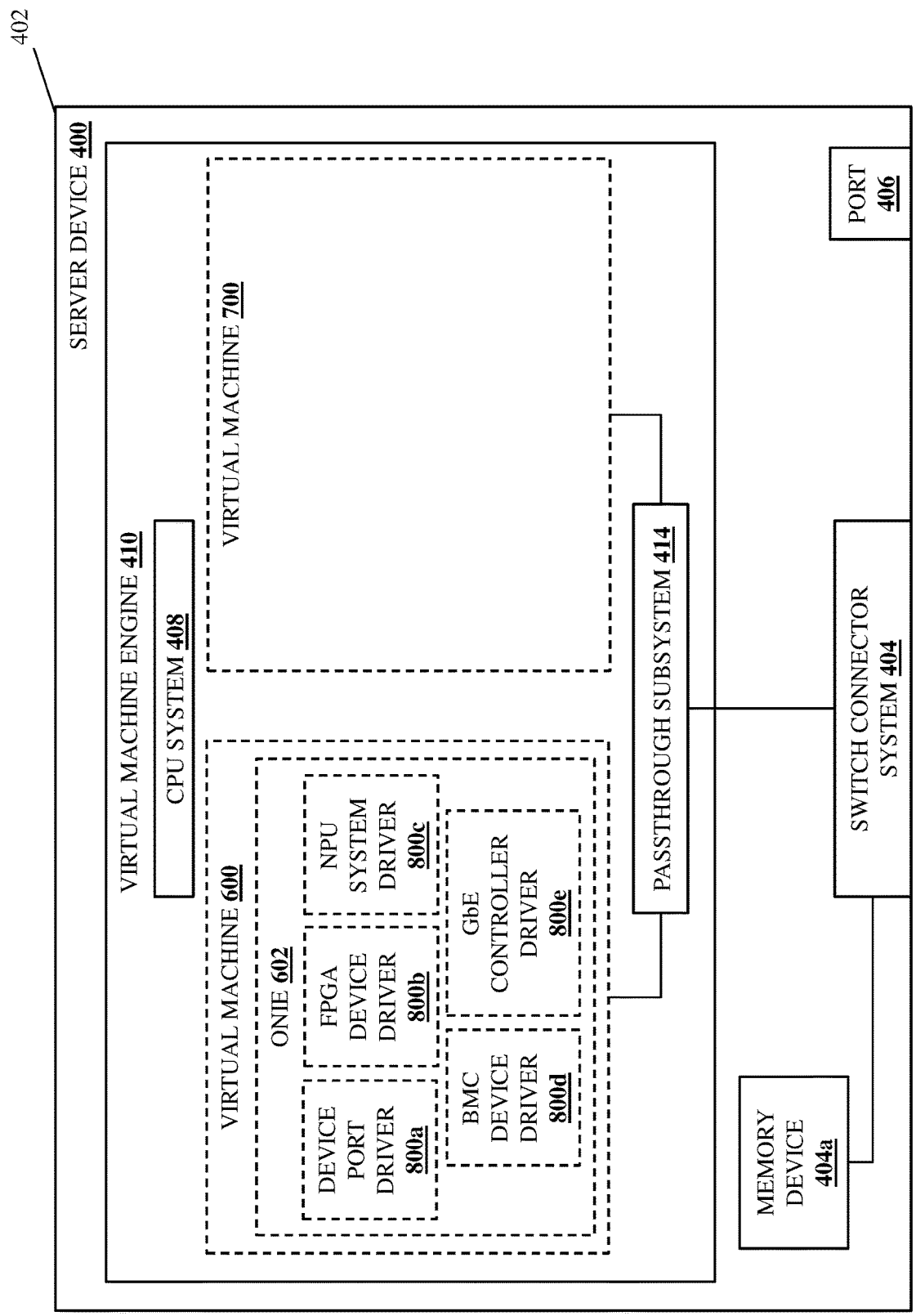
FIG. 8 is a schematic view illustrating an embodiment of the server device of FIG. 4 operating during the method of FIG. 5.

With reference to FIG. 8, and as will be appreciated by one of skill in the art in possession of the present disclosure, the provisioning of the ONIE 602 on the virtual machine 600 will include installing each of a device port driver 800a for use in communicating with the device port 310 in the switch device 204/300, an FPGA device driver 800b for use in communicating with the FPGA device 312 in the switch device 204/300, an NPU system driver 800c for use in communicating with the NPU system 304 in the switch device 204/300, a BMC device driver 800d for use in communicating with the BMC device 322 in the switch device 204/300, a GbE controller driver 800e for use in communicating with the GbE controller 324 in the switch device 204/300, and/or any other drivers and/or software components that one of skill in the art in possession of the present disclosure would recognize as enabling the communications described below.

Figure 9A:
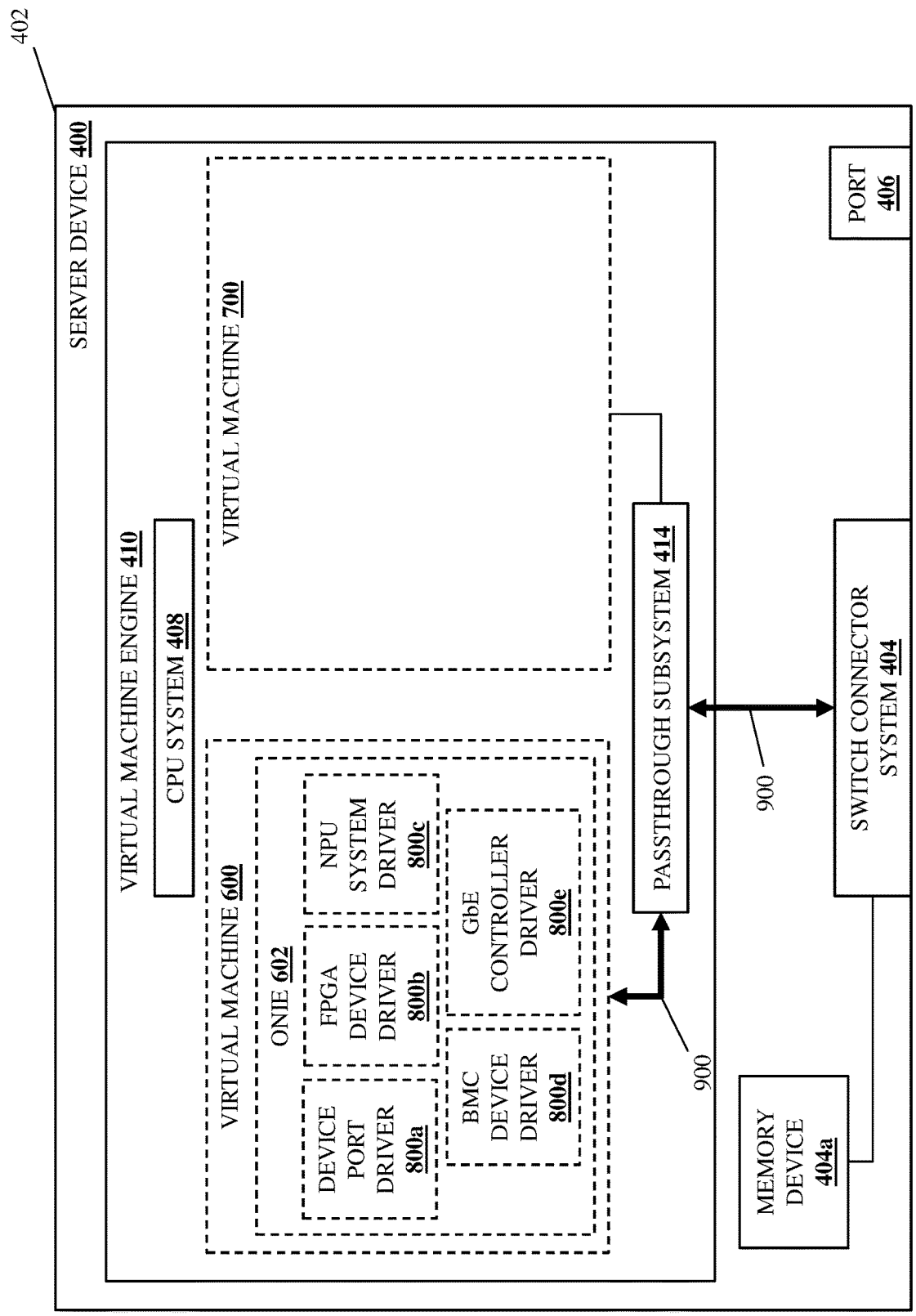
FIG. 9A is a schematic view illustrating an embodiment of the server device of FIG. 4 operating during the method of FIG. 5.
Figure 9B:
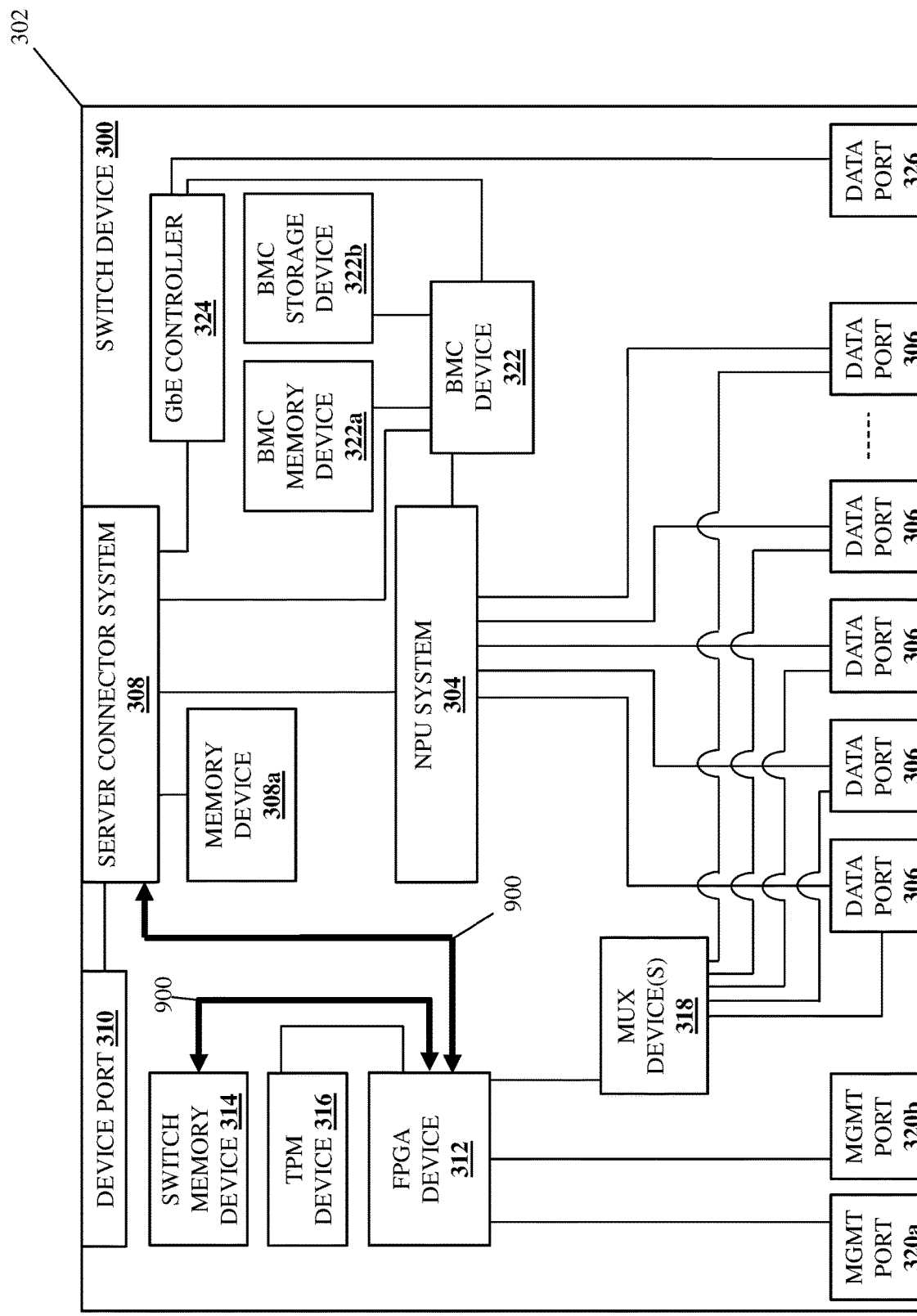
FIG. 9B is a schematic view illustrating an embodiment of the switch device of FIG. 3 operating during the method of FIG. 5.

In an embodiment, at block 506, the virtual machine 600 provided by the virtual machine engine 410 in the server device 202/400 may be initialized and, in response, the ONIE 602 will operate to initialize and enumerate components (e.g., endpoints or other PCIe devices) in the switch device 204/300 via the server/switch cabling 206. With reference to FIGS. 9A and 9B, the ONIE 602 may then load the FPGA device driver 800b and perform switch device memory access operations 900 that include accessing the FPGA device 312 in the switch device 300 via the passthrough subsystem 414, the switch connector system 404, the server/switch cabling 206, and the server connector system 308, and utilizing an I2C controller instantiated in the FPGA device 312 to access the switch memory device 314 (e.g., a switch device EEPROM device) in order to retrieve information about the switch device 204/300 such as an Out-Of-Band Management (OOBM) Media Access Control (MAC) address, as well as any other switch device information that would be apparent to one of skill in the art in possession of the present disclosure.

Figure 10A:
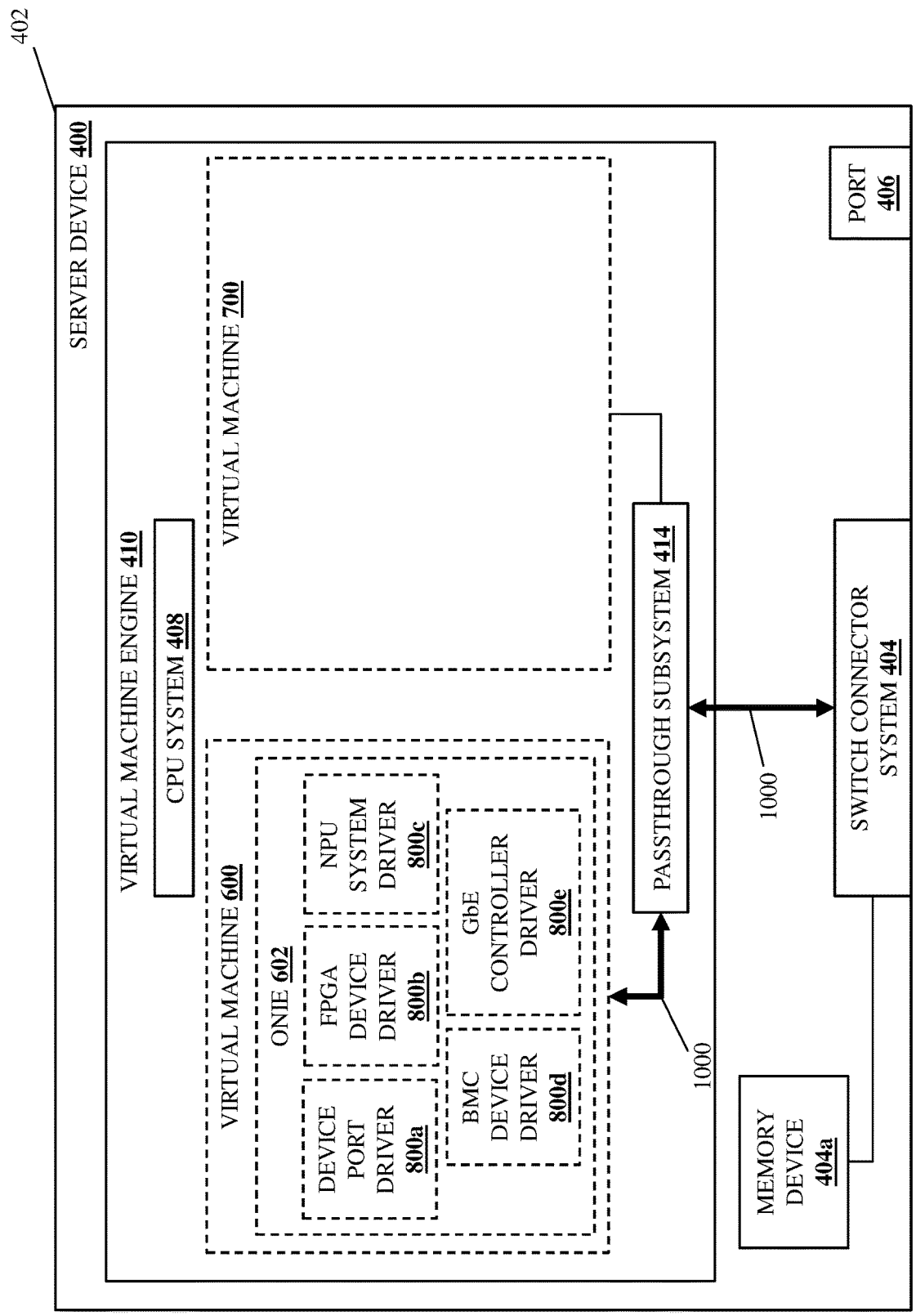
FIG. 10A is a schematic view illustrating an embodiment of the server device of FIG. 4 operating during the method of FIG. 5.
Figure 10B:
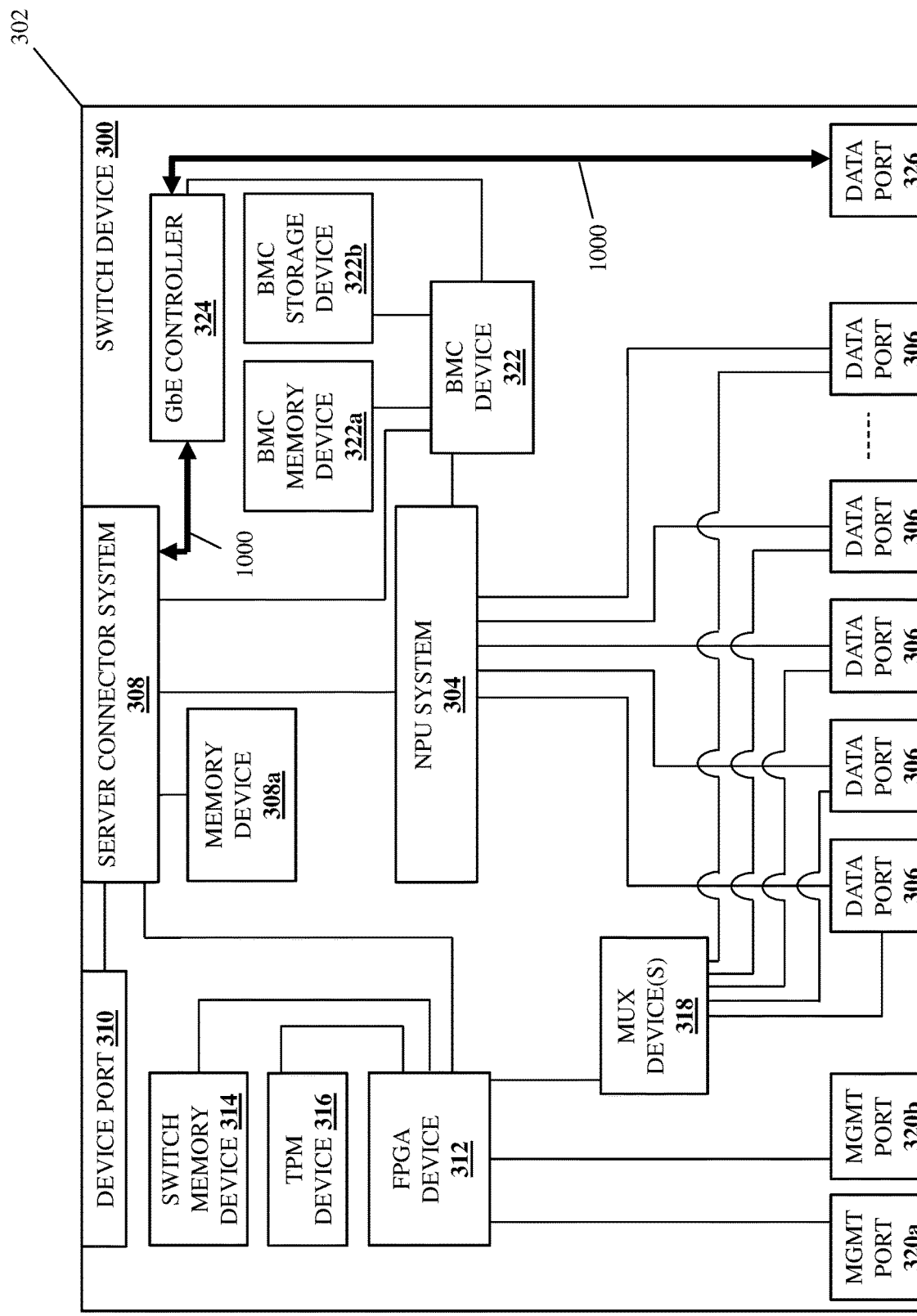
FIG. 10B is a schematic view illustrating an embodiment of the switch device of FIG. 3 operating during the method of FIG. 5.
Figure 11A:
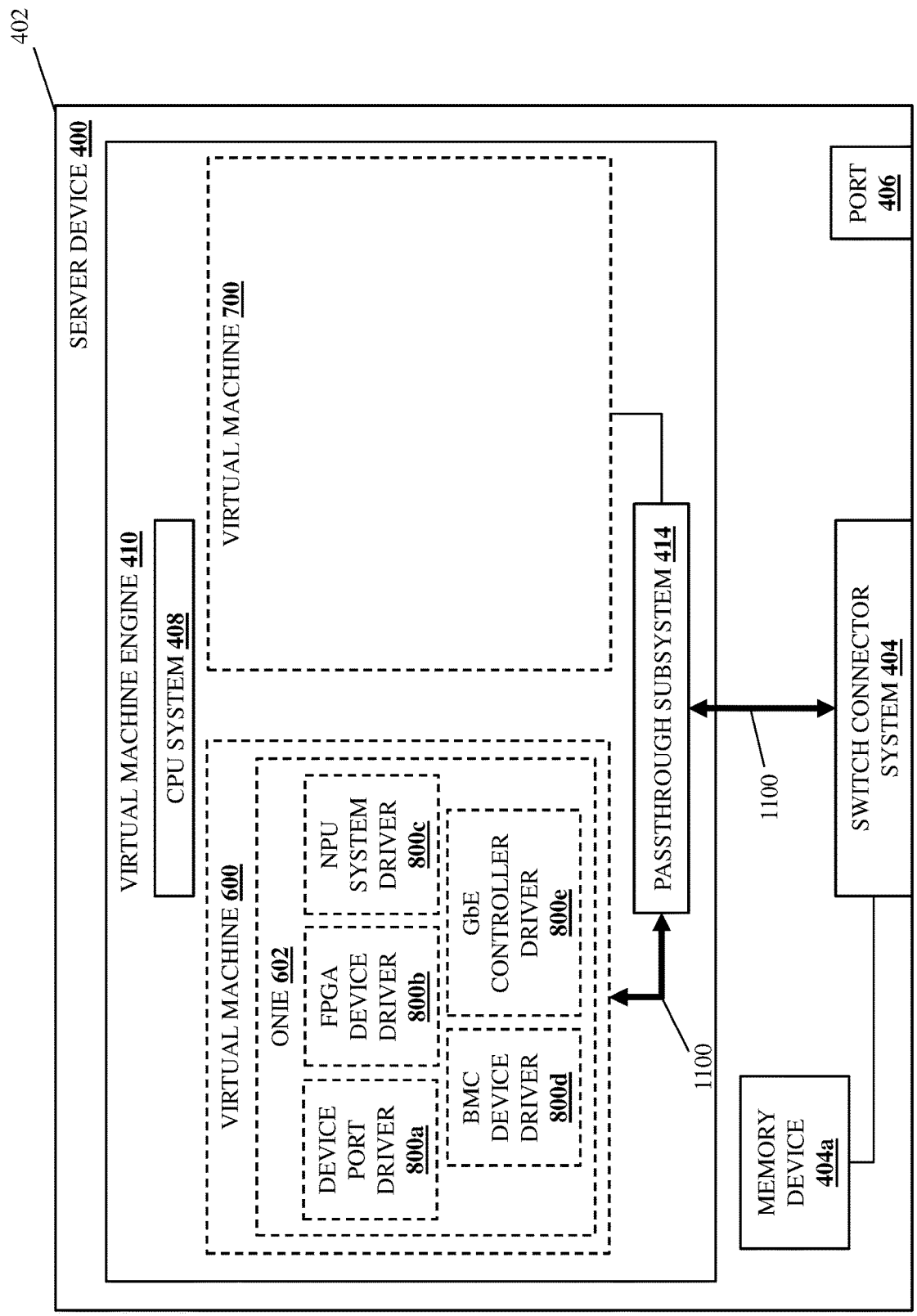
FIG. 11A is a schematic view illustrating an embodiment of the server device of FIG. 4 operating during the method of FIG. 5.
Figure 11B:
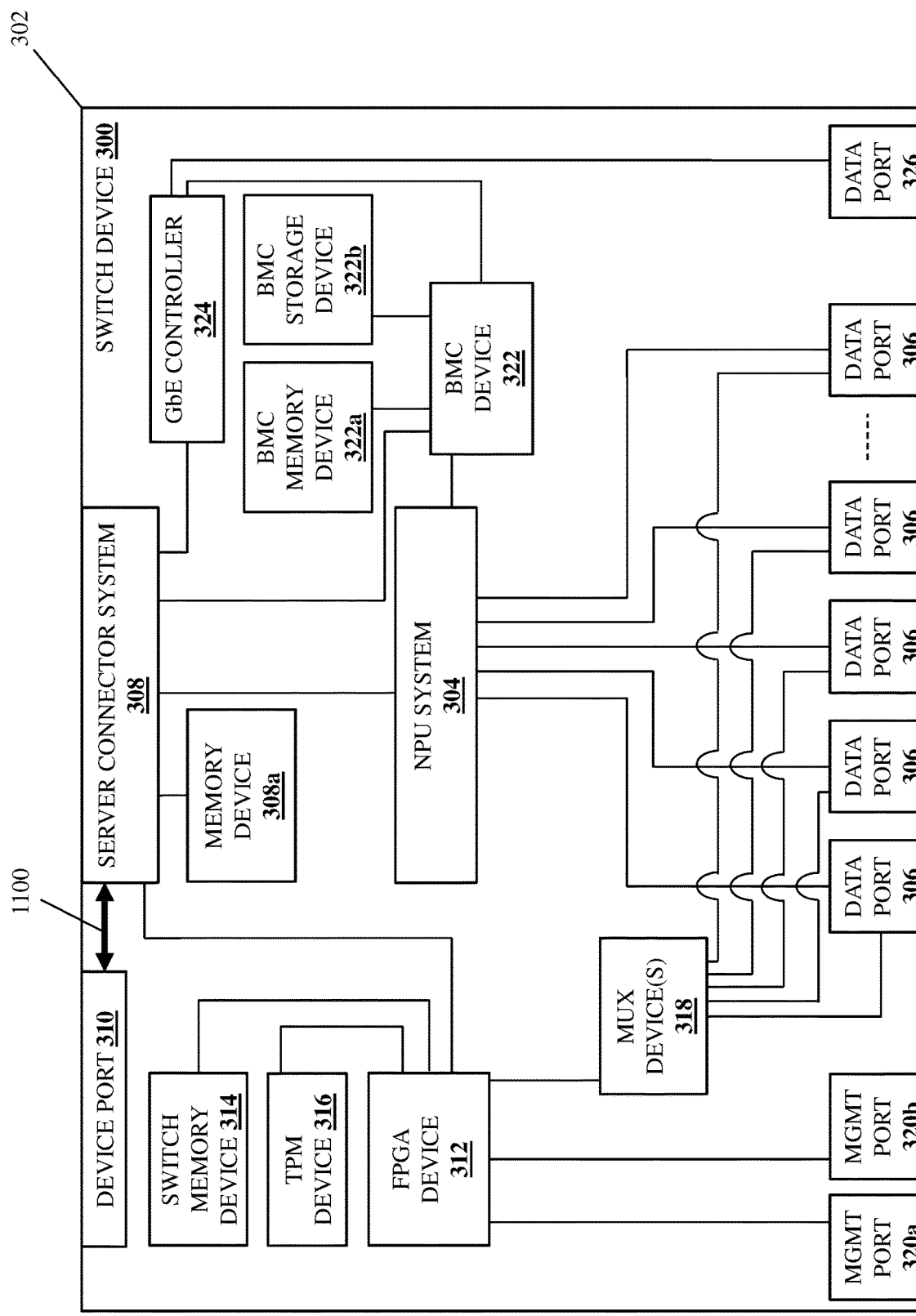
FIG. 11B is a schematic view illustrating an embodiment of the switch device of FIG. 3 operating during the method of FIG. 5.

With reference to FIGS. 10A and 10B, in some examples of block 506, the ONIE 602 may then load the GbE controller driver 800e and perform NOS image retrieval operations 1000 that include accessing the GbE controller 324 in the switch device 204/300 via the passthrough subsystem 414, the switch connector system 404, the server/switch cabling 206, and the server connector system 308, initializing the GbE controller 324 with the OOBM MAC address retrieved from the switch memory device 314 as discussed above, and then using the GbE controller 324 to retrieve an NOS image through the data port 326 and via a network. However, with reference to FIGS. 11A and 11B, in other examples of block 506 the ONIE 602 may load the device port driver 800a and perform NOS image retrieval operations 1100 that include accessing the device port 310 in the switch device 204/300 via the passthrough subsystem 414, the switch connector system 404, the server/switch cabling 206, and the server connector system 308, and retrieving an NOS image from a storage device connected to the device port 310. However, while a few specific examples of the retrieval of an NOS image have been described, one of skill in the art in possession of the present disclosure will appreciate how NOS images may be retrieved using other techniques that will fall within the scope of the present disclosure as well. Furthermore, one of skill in the art in possession of the present disclosure will appreciate how the NOS image discussed above may be replaced by a diagnostic system image while remaining within the scope of the present disclosure as well.

Figure 12:
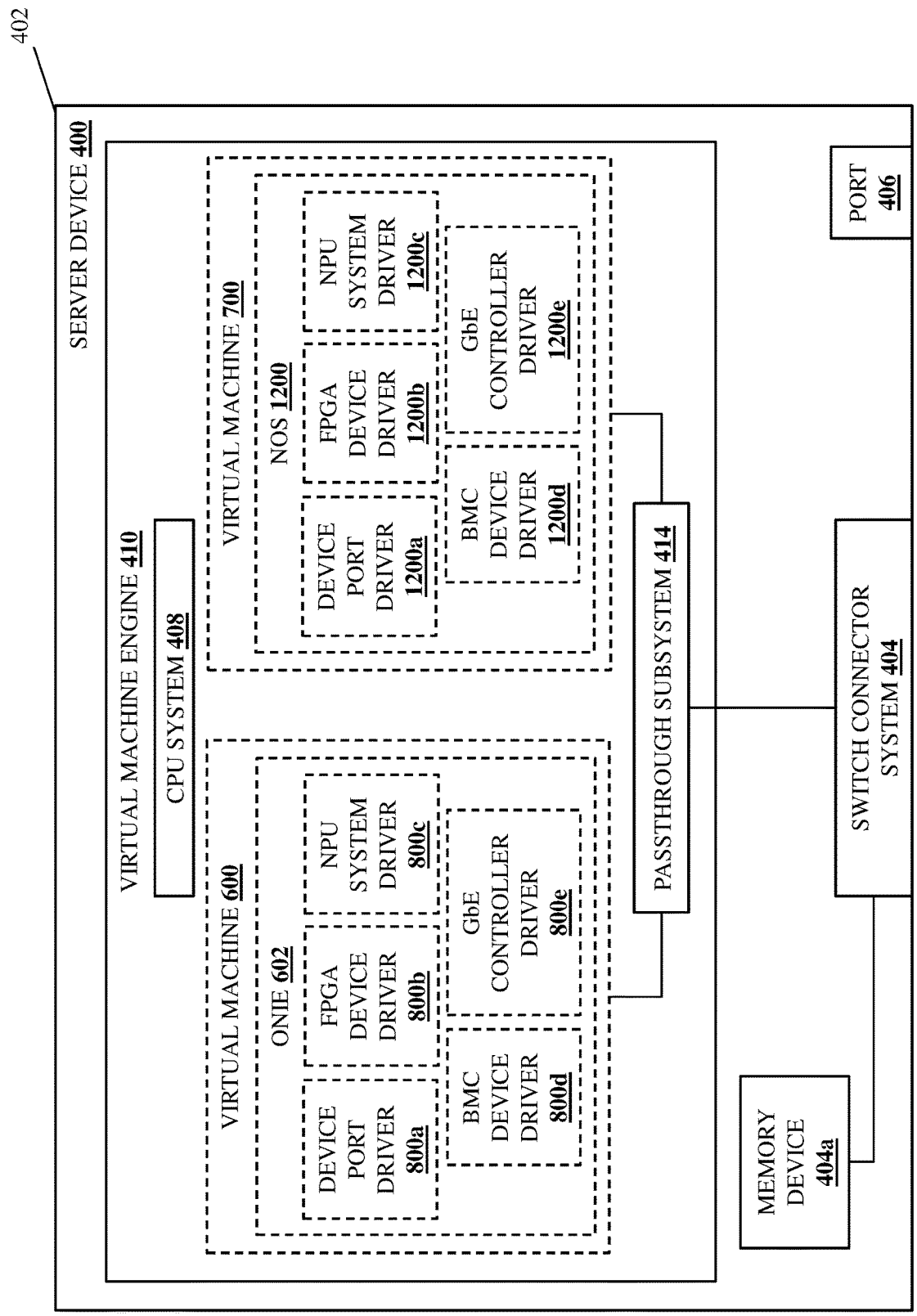
FIG. 12 is a schematic view illustrating an embodiment of the server device of FIG. 4 operating during the method of FIG. 5.

With reference to FIG. 12, at block 506 the ONIE 602 may then use the NOS image to provide an NOS 1200 on the virtual machine 700 (e.g., on a virtual storage device used to provide the virtual machine 700), and one of skill in the art in possession of the present disclosure will appreciate how the provisioning of the NOS 1200 on the virtual machine 700 may include installing each of a device port driver 1200a for use in communicating with the device port 310 in the switch device 204/300, an FPGA device driver 1200b for use in communicating with the FPGA device 312 in the switch device 204/300, an NPU system driver 1200c for use in communicating with the NPU system 304 in the switch device 204/300, a BMC device driver 1200d for use in communicating with the BMC device 322 in the switch device 204/300, a GbE controller driver 1200e for use in communicating with the GbE controller 324 in the switch device 204/300, and/or any other drivers and/or software components that one of skill in the art in possession of the present disclosure would recognize as enabling the communications described below. However, while a specific technique for providing an NOS (or diagnostic system) on a virtual machine in the server device 202/400 is described herein, one of skill in the art in possession of the present disclosure will appreciate how the server device 202/400 may be configured to provide an NOS (or diagnostic system) in a variety of manners that will fall within the scope of the present disclosure as well.

Figure 13A:
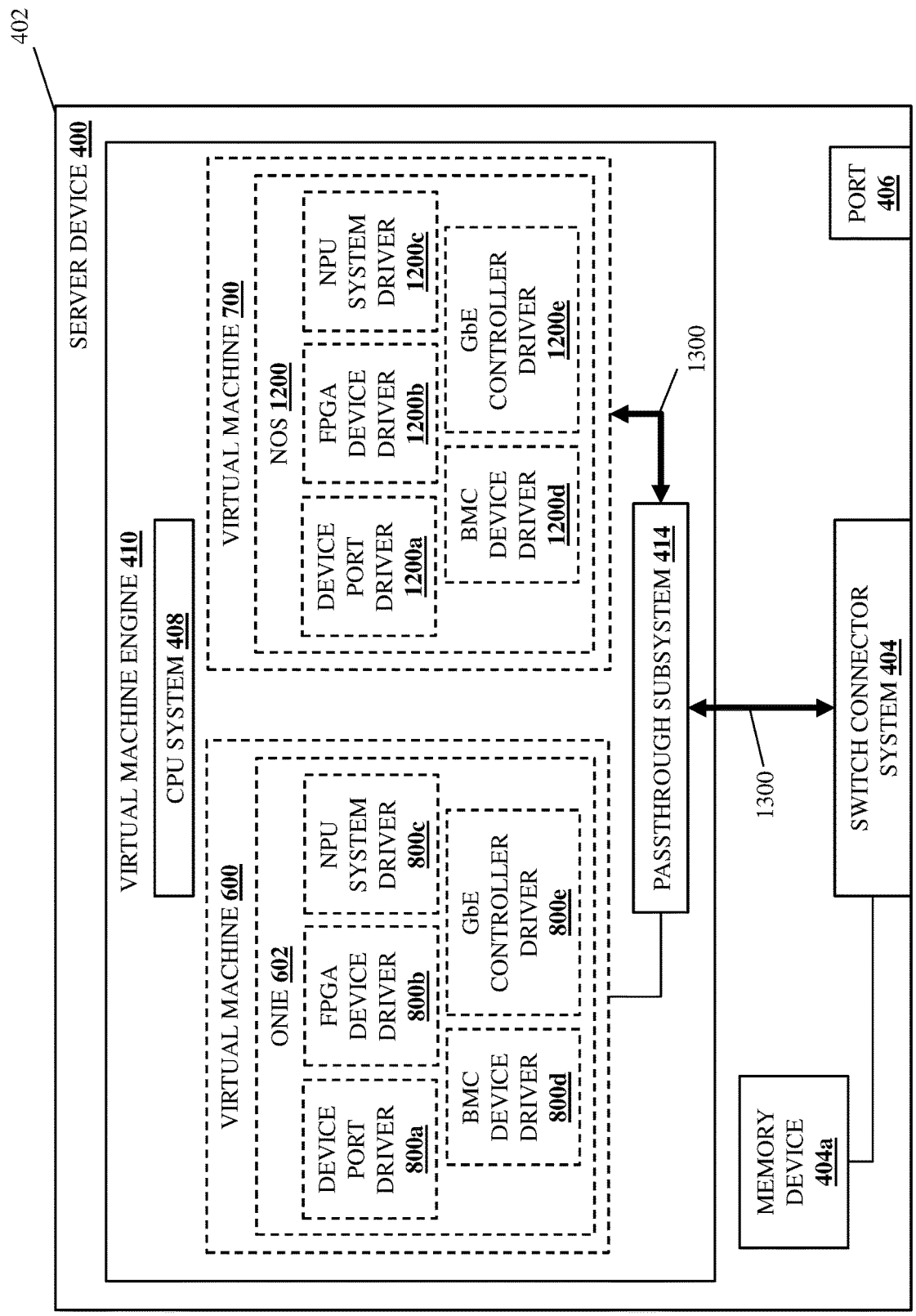
FIG. 13A is a schematic view illustrating an embodiment of the server device of FIG. 4 operating during the method of FIG. 5.
Figure 13B:
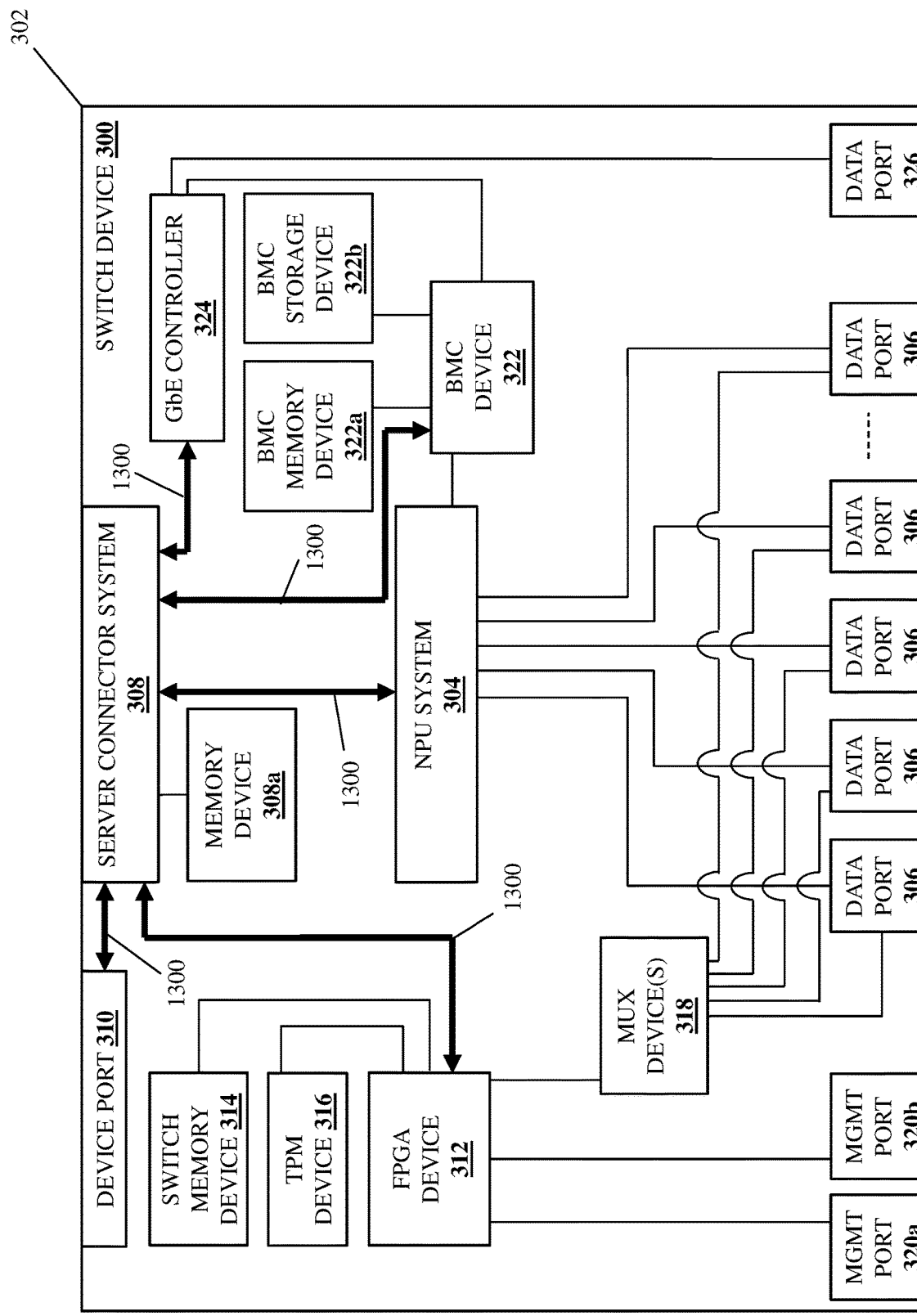
FIG. 13B is a schematic view illustrating an embodiment of the switch device of FIG. 3 operating during the method of FIG. 5.

The method 500 then proceeds to block 508 where an NOS in the server device communicates with switch components in the switch device via the server/switch cabling. In an embodiment, at block 508, the NOS 1200 provided by the virtual machine 700 in the server device 202/400 may be powered on, reset, rebooted, and/or otherwise initialized. With reference to FIGS. 13A and 13B, in an embodiment of block 508, the NOS 1200 (e.g., an NOS kernel included in the NOS 1200) may then perform enumeration operations 1300 (e.g., PCIe device/endpoint enumeration operations) via the passthrough subsystem 414, the switch connector system 404, the server/switch cabling 206, and the server connector system 308, in order to enumerate the device port 310, the FPGA device 312, the NPU system 304, the BMC device 322, and the GbE controller 324. Following the enumeration operations 1400, the NOS 1200 may load the device port driver 1200a for the device port 310, the FPGA device driver 1200b for the FPGA device 312, the NPU system driver 1200c for the NPU system 304, the BMC device driver 1200d for the BMC device 322, and the GbE controller driver 1200e for the GbE controller 324.

Figure 14A:
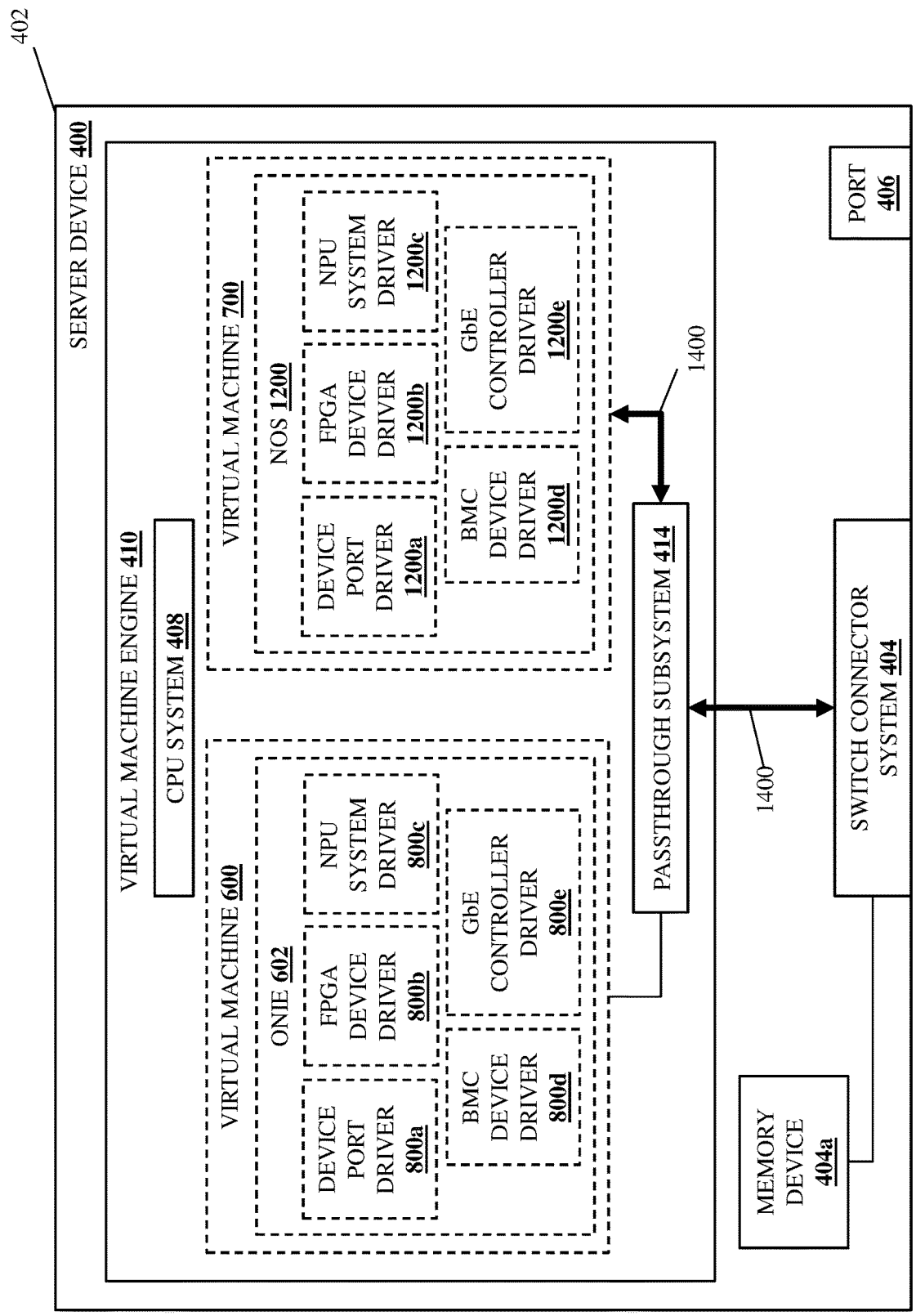
FIG. 14A is a schematic view illustrating an embodiment of the server device of FIG. 4 operating during the method of FIG. 5.
Figure 14B:
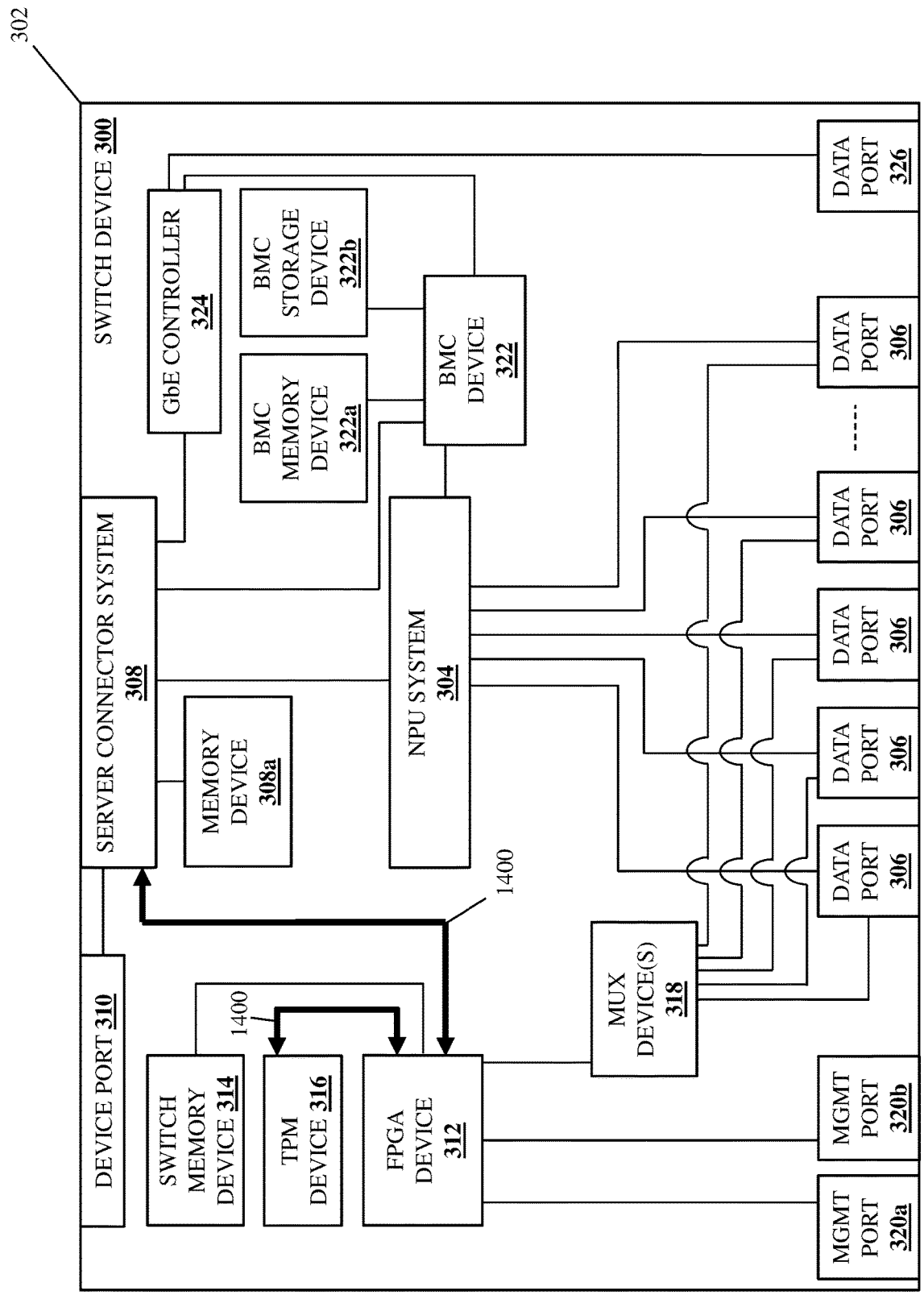
FIG. 14B is a schematic view illustrating an embodiment of the switch device of FIG. 3 operating during the method of FIG. 5.

With reference to FIGS. 14A and 14B, in some embodiments the initialization of the NOS 1200 may include NOS 1200 loading the FPGA device driver 1200b and performing TPM device access operations 1400 that include accessing the FPGA device 312 in the switch device 300 via the passthrough subsystem 414, the switch connector system 404, the server/switch cabling 206, and the server connector system 308, and utilizing an I2C controller instantiated in the FPGA device 312 to access the TPM device 316 in order to perform secure initialization (e.g., "secure boot") operations, as well as any other initialization operations that would be apparent to one of skill in the art in possession of the present disclosure.

Figure 15A:
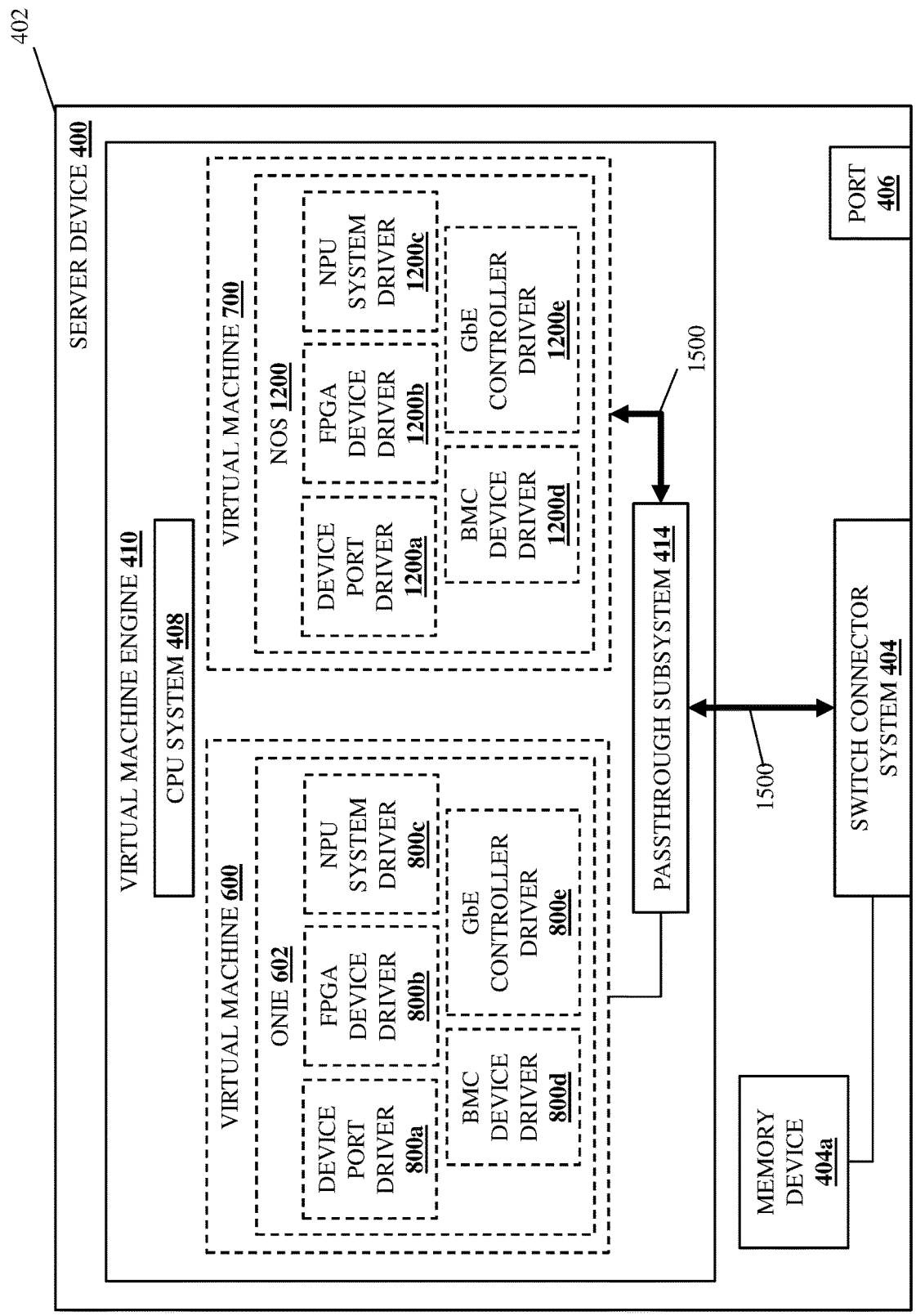
FIG. 15A is a schematic view illustrating an embodiment of the server device of FIG. 4 operating during the method of FIG. 5.
Figure 15B:
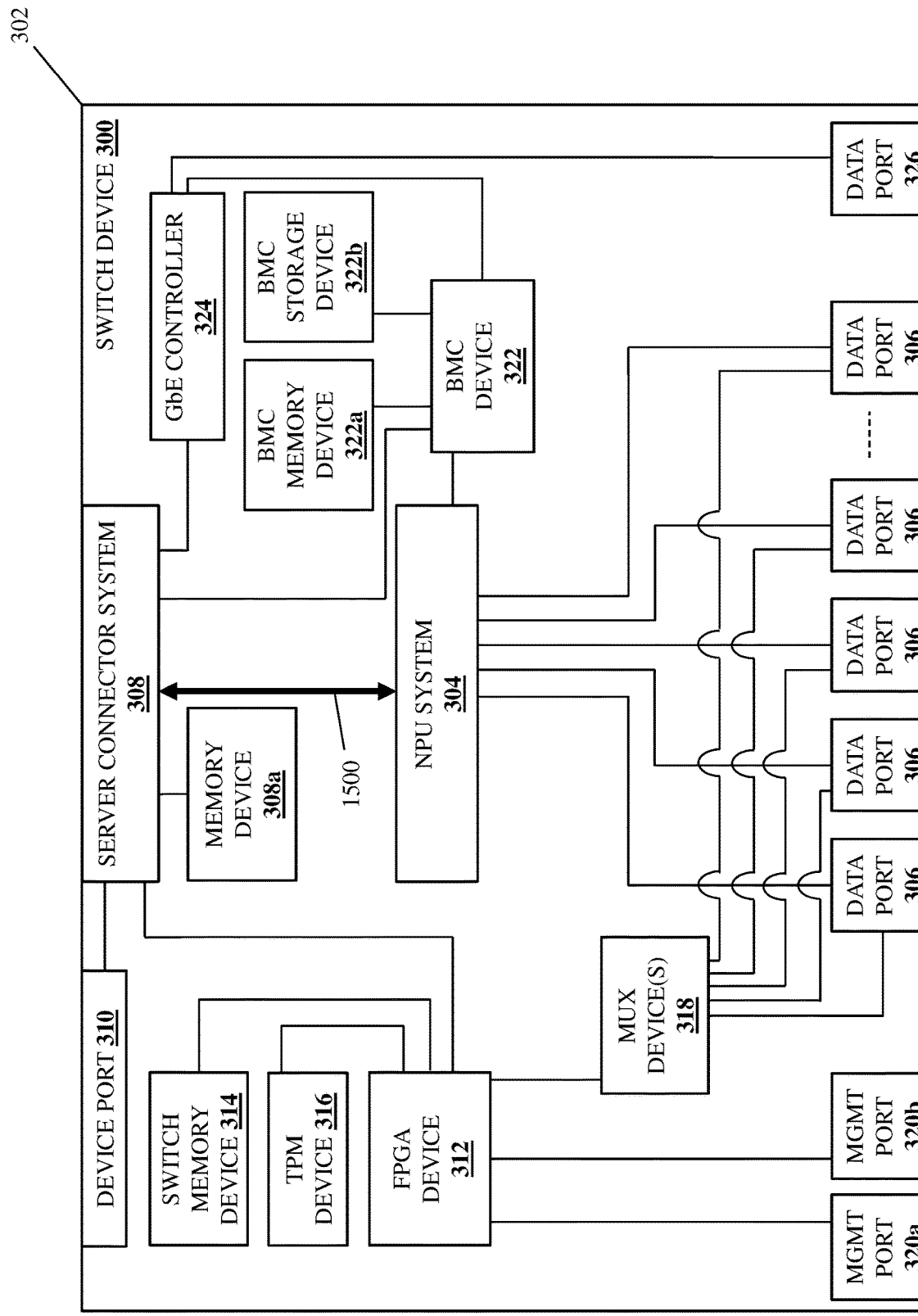
FIG. 15B is a schematic view illustrating an embodiment of the switch device of FIG. 3 operating during the method of FIG. 5.

Subsequently, with reference to FIGS. 15A and 15B, the NOS 1200 may perform NPU configuration operations 1500 that include using the NPU system driver 1200c to access the NPU system 304 via the passthrough subsystem 414, the switch connector system 404, the server/switch cabling 206, and the server connector system 308, and then configuring the NPU system 304. For example, the configuration of the NPU system 304 may include providing a plurality of switch tables in the NPU memory subsystem in the NPU system 304 that one of skill in the art in possession of the present disclosure will recognize may be utilized by the NPU processor subsystem in the NPU system 304 to route data traffic via the data ports 306 and/or otherwise provide a data plane for the switch device 400.

In another example, the configuration of the NPU system 304 may include configuring Control Plane Policing (CoPP) rule(s) for the NPU system 304 that define how control and management data packets received via the ports 306 may be provided by the NPU system 304 to the NOS 1200. As will be appreciated by one of skill in the art in possession of the present disclosure, the configuration of the CoPP rules for the NPU system 304 may be based on the virtual processing resources available to the virtual machine 700 providing the NOS 1200, with CoPP thresholds increased as those virtual processing resources increase to allow the NPU system 304 to provide an increased number of control and management data packets received via the ports 306 to the NOS 1200.

However, while a few specific NPU system configuration operations have been described, one of skill in the art in possession of the present disclosure will appreciate how a variety of NPU system configuration operations may be performed at block 508 while remaining within the scope of the present disclosure as well. For example, the NOS 1200 may configure the NPU system 304 for Layer 2 (L2) forwarding (e.g., switching) operations, Layer 3 (L3) forwarding (e.g., routing) operations, Equal Cost Multi-Path (ECMP) operations, port ingress/egress admission and buffer control operations, port ingress/egress packet scheduling operations, Quality of Server (QoS) operations, congestion management/Priority Flow Control (PFC) operations, buffer statistics tracking operations, packet sampling operations, packet mirroring operations, generic route encapsulation operations, IP-in-IP operations, Virtual extensible Local Area Network (VxLAN) tunneling operations, virtual route forwarding operations, stacking operations, link aggregation and control operations, port extender operations, port breakout operations, port speed and auto-negotiation setting operations, port stacking operations, statistics operations, and/or other operations that would be apparent to one of skill in the art in possession of the present disclosure.

Figure 16A:
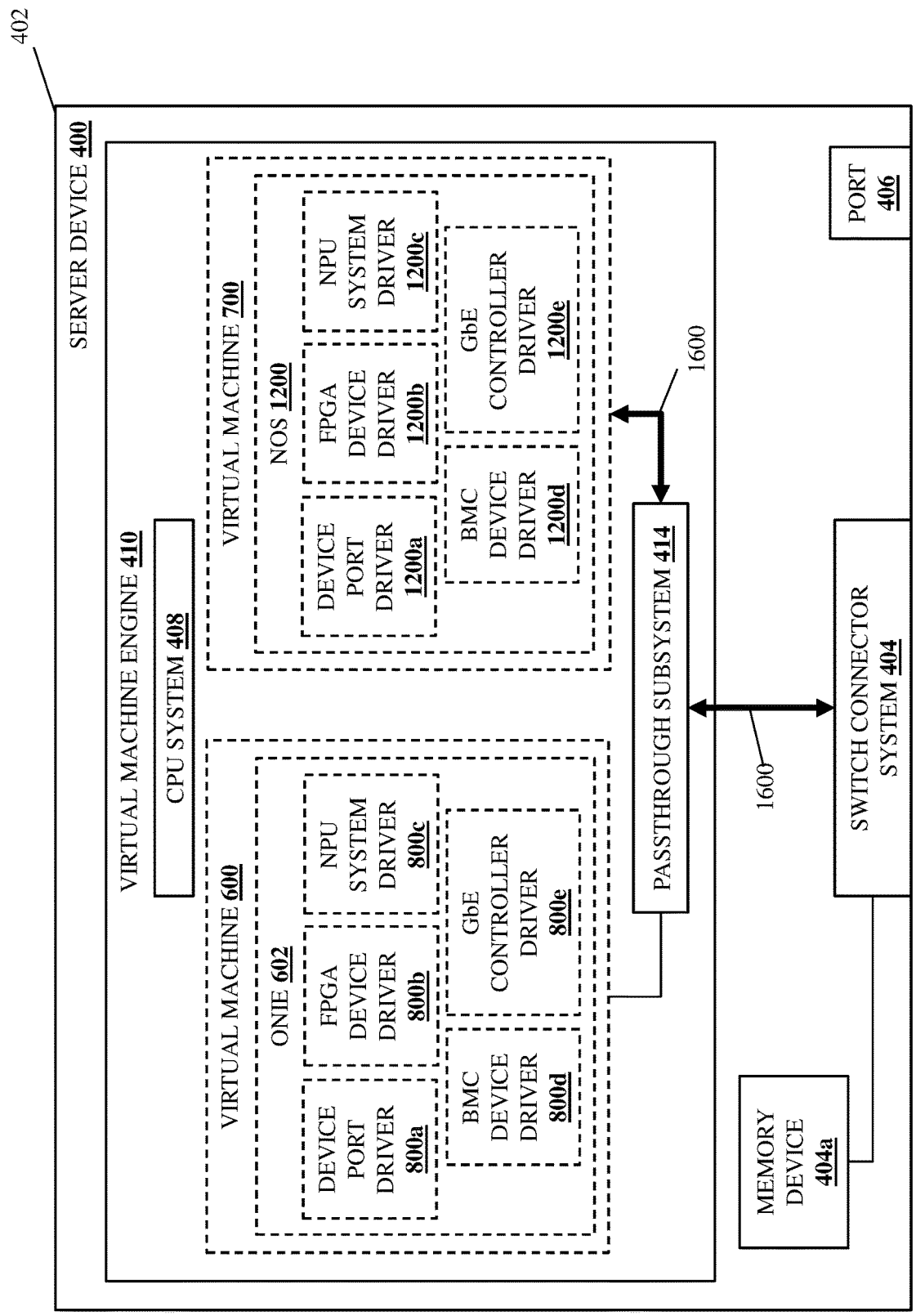
FIG. 16A is a schematic view illustrating an embodiment of the server device of FIG. 4 operating during the method of FIG. 5.
Figure 16B:
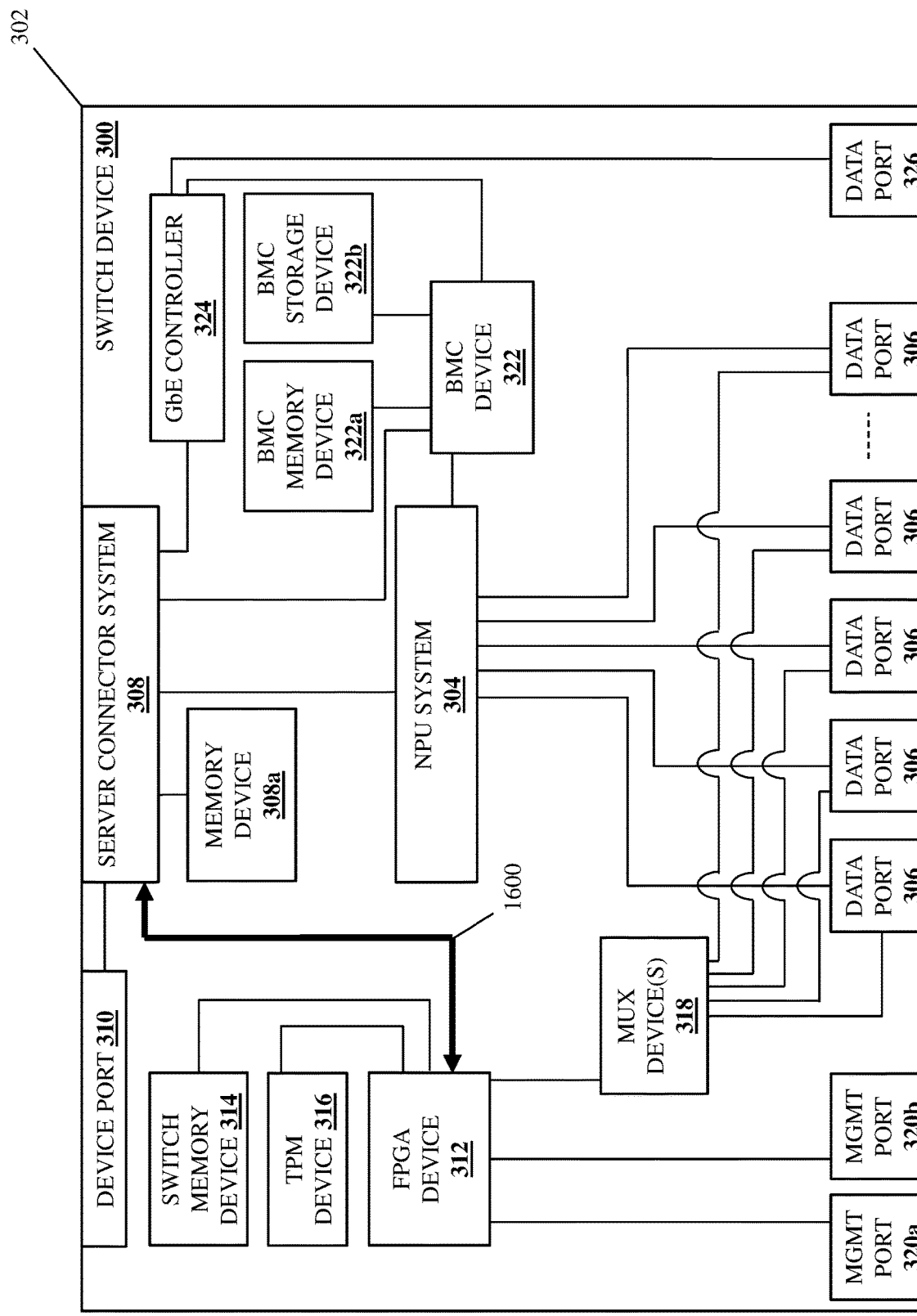
FIG. 16B is a schematic view illustrating an embodiment of the switch device of FIG. 3 operating during the method of FIG. 5.
Figure 17A:
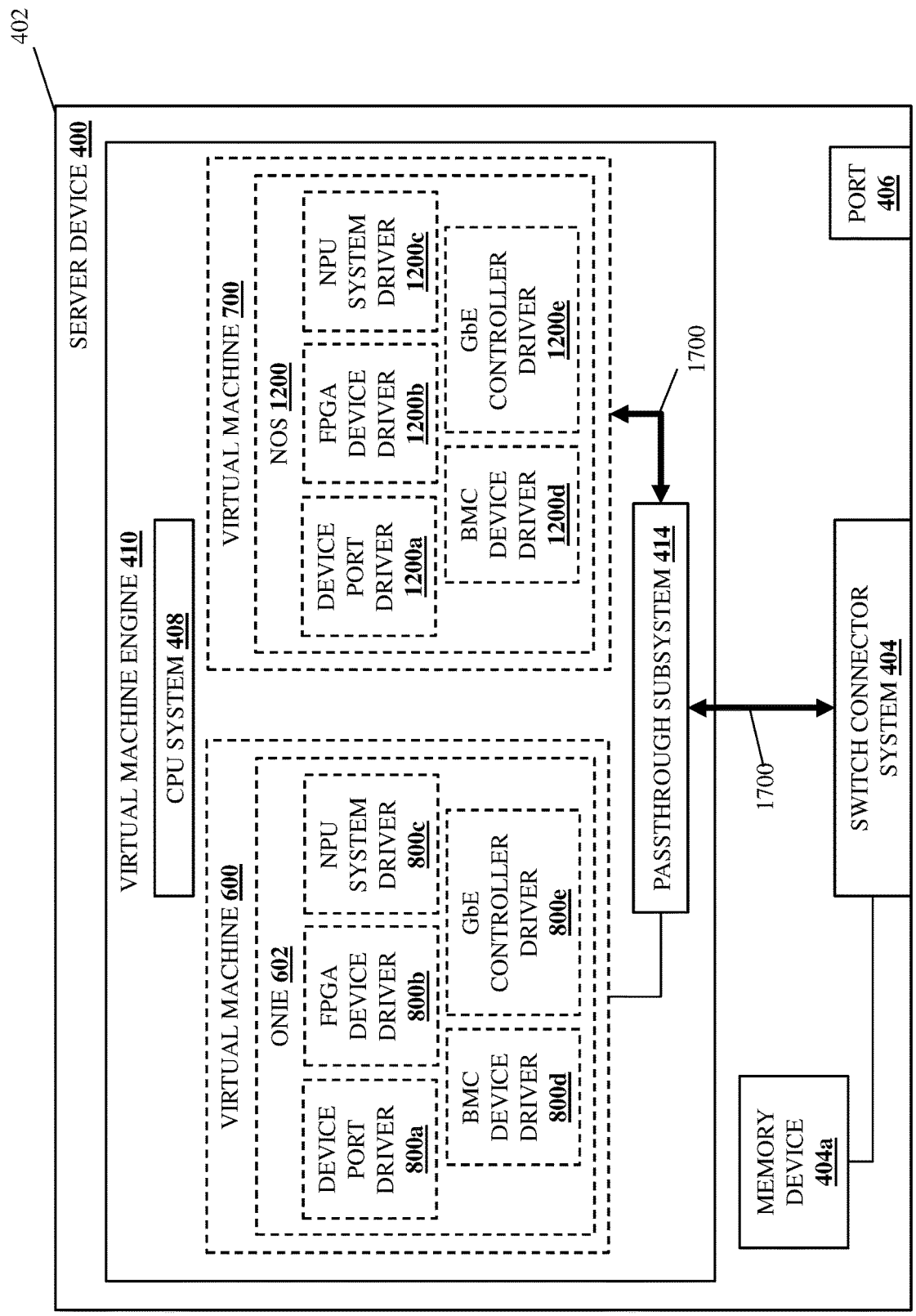
FIG. 17A is a schematic view illustrating an embodiment of the server device of FIG. 4 operating during the method of FIG. 5.
Figure 17B:
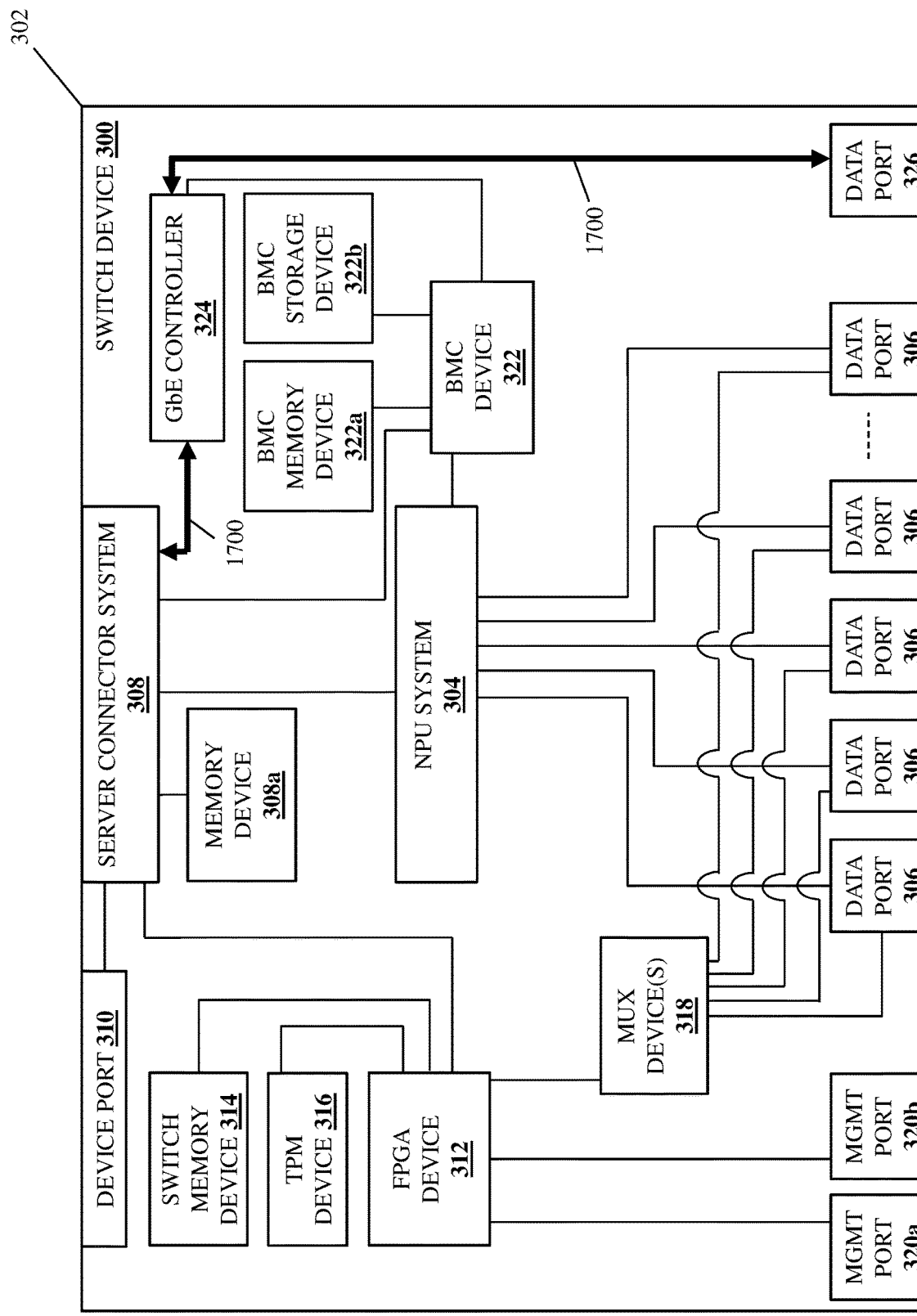
FIG. 17B is a schematic view illustrating an embodiment of the switch device of FIG. 3 operating during the method of FIG. 5.

Following the configuration of the NPU system 304, the NPU system 304 may operate to transmit "primary" data packets via the data ports 306. Furthermore, with reference to FIGS. 16A and 16B, in some embodiments and during the "runtime" operation of the switch device 204/300 in which "primary" data packets are transmitted and other runtime operations known in the art are performed, the NOS 1200 may load the FPGA device driver 1200b and perform heartbeat exchange operations 1600 that include accessing the FPGA device 312 in the switch device 300 via the passthrough subsystem 414, the switch connector system 404, the server/switch cabling 206, and the server connector system 308, and exchanging heartbeat communications with the FPGA device 312. However, with reference to FIGS. 17A and 17B, in some embodiments and during the "runtime" operation of the switch device 204/300 in which "primary" data packets are transmitted and other runtime operations known in the art are performed, the NOS 1200 may load the GbE controller driver 1200e and perform heartbeat exchange operations 1700 that include accessing the GbE controller 324 in the switch device 300 via the passthrough subsystem 414, the switch connector system 404, the server/switch cabling 206, and the server connector system 308, and utilizing the GbE controller 324 to exchange heartbeat communications via the data port 326 and the management network coupled to the data port 326 (e.g., as a backup to the heartbeat communications exchanged with the FPGA device 312 discussed above).

In some embodiments, the virtual machine 700 that provides the NOS 1200 may become unavailable, and "failover" operations may be performed as described in U.S. patent application Ser. No. 17/896,150, filed on Aug. 26, 2022, the disclosure of which is incorporated herein by reference in its entirety. However, while a plurality of operations by the NOS 1200 have been illustrated and described, one of skill in the art in possession of the present disclosure will appreciate how a virtual machine similar to the virtual machine 700 described above may be used to provide a diagnostic system that operates similarly to the NOS 1200 discussed above, but with the diagnostic system configured to "exercise" the device port 310, the FPGA device 312, the NPU system 304, the BMC device 322, the GbE controller 324, and/or any other components of the switch device 204/300 that would be apparent to one of skill in the art in possession of the present disclosure.

Furthermore, while not illustrated or described in detail, one of skill in the art in possession of the present disclosure will appreciate how each of the ONIE, NOS, and diagnostics system discussed above may include respective Command Line Interface (CLI) applications that the ONIE, NOS, or diagnostics system may make accessible via the management ports 320a and 320b, allowing a network administrator or other user to connect to those management ports 320a or 320b and access that CLI application in order to manage the ONIE, NOS, or diagnostics system.

Thus, systems and methods have been described that disaggregate a Network Operating System (NOS) from the switch device that uses it by providing that NOS for that switch device using a server device that is coupled to that switch device via server/switch cabling. For example, the server-based-Network Operating System (NOS) disaggregated switch device system of the present disclosure may include a server device having a server chassis, a switch connector that is accessible on the server chassis, and a Central Processing Unit (CPU) system that is housed in the server chassis, that is coupled to the switch connector, and that is configured to provide a Network Operating System (NOS). Server/switch cabling is connected to the switch connector. A switch device includes a switch chassis, a server connector that is accessible on the switch chassis and that is connected to the server/switch cabling, and a Network Processing Unit (NPU) system that is housed in the switch chassis, that is coupled to the server connector, and that includes a memory subsystem that is configured to be provided with a plurality of switch tables via the server/switch cabling and by the NOS provided by the CPU system in the server device.

As will be appreciated by one of skill in the art in possession of the present disclosure, the systems and methods of the present disclosure remedy the issues associated with the conventional provisioning of a NOS for a switch device using a CPU in that switch device, while enhancing the operation of both the switch device and its NOS. For example, as will be appreciated by one of skill in the art in possession of the present disclosure, the "offloading" of the provisioning of the NOS from switch devices to a server device eliminates the need for a CPU system (e.g., a "host" CPU "complex") in the switch device, and allows the NOS to leverage the relatively higher capability CPU system in the server device while eliminating CPU devices, DRAM devices, SSD devices, SPI flash devices, embedded Multi-Media Cards (eMMCs) from the switch device to allow for smaller dimension switch devices, better thermal performance in switch devices, reduced manufacturing, development, and testing required for switch device, and/or other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A server-based-Network Operating System (NOS) disaggregated switch device system, comprising:
  a switch device including:
    a switch chassis;
    a server connector that is accessible on the switch chassis;
    a Network Processing Unit (NPU) system that is housed in the switch chassis and that is coupled to the server connector;
    a Field Programmable Gate Array (FPGA) device that is housed in the switch chassis and that is coupled to the server connector; and
    a Gigabit Ethernet (GbE) controller that is housed in the switch chassis and that is coupled to the server connector;
  a server device including:
    a server chassis;
    a switch connector that is accessible on the server chassis; and
    a Central Processing Unit (CPU) system that is housed in the server chassis, that is coupled ot the switch connector, and that is configured to provide a Network Operating System (NOS) for the switch device; and
  server/switch cabling that directly connects the switch device to the server device, wherein the NOS provided by the CPU system is configured to:
    enumerate, via the server/switch cabling, the FPGA device and, in response, load an FPGA device driver for the FPGA device and use the FPGA device driver to perform FPGA/NOS operations via the FPGA device;
    enumerate, via the server/switch cabling, the NPU system and, in response, load an NPU system driver for the NPU system and use the NPU system driver to perform NPU/NOS operations via the NPU system; and
    enumerate, via the server/switch cabling, the GbE controller and, in response, load a GbE controller driver for the GbE controller and use the GbE controller driver to perform GbE controller/NOS operations via the GbE controller.

2. The system of claim 1, wherein the FPGA/NOS operations via the FPGA device includes:
  transmitting communications to at least one of a switch memory device, a Trusted Platform Module (TPM) device, and a console port that is coupled to the FPGA device.

3. The system of claim 1, wherein the switch device includes:
  a Baseboard Management Controller (BMC) device that is housed in the switch chassis, and that is coupled to the server connector, wherein the NOS provided by the CPU system is configured to;
  enumerate, via the server/switch cabling, the BMC device and, in response, load a BMC device driver for the BMC device and use the BMC device driver to perform BMC/NOS operations via the BMC device.

4. The system of claim 1, wherein the GbE controller/NOS operations via the GbE controller include:
  transmitting communications to a network that is coupled to the GbE controller.

5. The system of claim 1, wherein each of the switch connector on the server device and the server connector on the switch device are provided by respective Peripheral Component Interconnect express (PCIe) connector devices, or by respective Universal Serial Bus (USB) connector devices.

6. The system of claim 1, wherein each of the switch connector on the server device and the server connector on the switch device are provided by respective switch components, or by respective re-timer components.

7. The system of claim 1, wherein the CPU system in the server device is configured to provide a virtual machine that includes the NOS.

8. An Information Handling System (IHS), comprising:
a chassis;
a switch connector that is accessible on the chassis and that is configured to directly connect to a switch device via server/switch cabling;
a Central Processing Unit (CPU) system that is housed in the chassis, that is coupled to the switch connector; and
a memory system that includes instructions that, when executed by the CPU system, cause the CPU system to provide a Network Operating System (NOS) for the switch device that is configured, when the switch device is directly connected to the switch connector via the server/switch cabling, to:
 enumerate, via the server/switch cabling, an FPGA device included in the switch device and, in response, load an FPGA device driver for the FPGA device and use the FPGA device driver to perform FPGA/NOS operations via the FPGA device;
 enumerate, via the server/switch cabling, the NPU system included in the switch device and, in response, load an NPU system driver for the NPU system and use the NPU system driver to perform NPU/NOS operations via the NPU system; and
 enumerate, via the server/switch cabling, the GbE controller included in the switch device and, in response, load a GbE controller driver for the GbE controller and use the GbE controller driver to perform GbE controller/NOS operations via the GbE controller.

9. The IHS of claim 8, wherein the FPGA/NOS operations via the FPGA device include:
transmitting communications to at least one of a switch memory device, a Trusted Platform Module (TPM) device, and a console port that is coupled to the FPGA device.

10. The IHS of claim 8, wherein the NOS is configured, when the switch device is directly connected to the switch connector via the server/switch cabling, to:
enumerate, via the server/switch cabling, a Baseboard Management Controller (BMC) device included in the switch device and, in response, load a BMC device driver for the BMC device and use the BMC device driver to perform BMC/NOS operations via the BMC device.

11. The IHS of claim 8, wherein the GbE controller/NOS operations via the GbE controller include:
transmitting communications to a network that is coupled to the GbE controller.

12. The IHS of claim 8, wherein the switch connector is provided by a Peripheral Component Interconnect express (PCIe) connector device, or by a Universal Serial Bus (USB) connector device.

13. The IHS of claim 8, wherein the memory system includes instructions that, when executed by the CPU system, cause the CPU system to provide a virtual machine that includes the NOS.

14. A method for providing a server-based-NOS disaggregated switch device, comprising:
directly connecting, by a server device, to a switch device via server/switch cabling that is directly connected to a switch connector that is accessible on a server chassis of the server device and a server connector that is accessible on a switch chassis of the switch device;
providing, by a Central Processing Unit (CPU) system included in the server chassis of the server device, a Network Operating System (NOS) for the switch device;
enumerating, by the NOS via the server/switch cabling, an FPGA device included in the switch chassis of the switch device and, in response, loading an FPGA device driver for the FPGA device and using the FPGA device driver to perform FPGA/NOS operations via the FPGA device;
enumerating, by the NOS via the server/switch cabling, the NPU system included in the switch chassis of the switch device and, in response, loading an NPU system driver for the NPU system and using the NPU system driver to perform NPU/NOS operations via the NPU system; and
enumerating, by the NOS via the server/switch cabling, the GbE controller included in the switch chassis of the switch device and, in response, loading a GbE controller driver for the GbE controller and using the GbE controller driver to perform GbE controller/NOS operations via the GbE controller.

15. The method of claim 14, wherein the FPGA/NOS operations via the FPGA device include:
transmitting communications to at least one of a switch memory device, a Trusted Platform Module (TPM) device, and a console port that is coupled to the FPGA device.

16. The method of claim 14, further comprising:
enumerating, by the NOS via the server/switch cabling, a Baseboard Management Controller (BMC) device included in the switch chassis of the switch device and, in response, loading a BMC device driver for the BMC device and using the BMC device driver to perform BMC/NOS operations via the BMC device.

17. The method of claim 14, wherein the GbE controller/NOS operations via the GbE controller include:
transmitting communications to a network that is coupled to the GbE controller.

18. The method of claim 14, wherein the server-switch connector is provided by a Peripheral Component Interconnect express (PCIe) connector device, or by a Universal Serial Bus (USB) connector device.

19. The method of claim 14, wherein the server connector on the switch device is provided by a switch component, or by a re-timer component.

20. The method of claim 14, further comprising:
providing, by the CPU system in the server device, a virtual machine that includes the NOS.

* * * * *